INVENTORS
FRED A. GUNN
HORTON H. MORRIS
ATTORNEYS

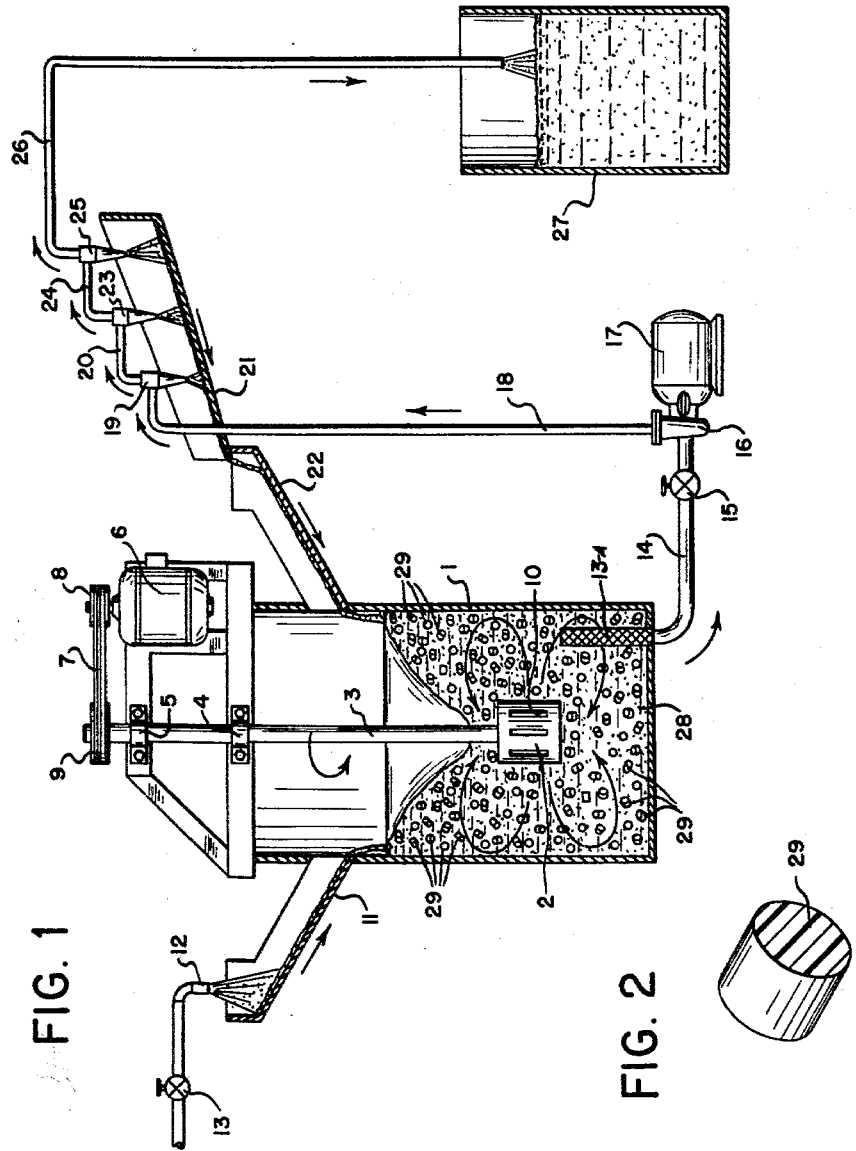
March 2, 1965    F. A. GUNN ETAL    3,171,718
DELAMINATED DOMESTIC SEDIMENTARY CLAY PRODUCTS
AND METHOD OF PREPARATION THEREOF
Filed Feb. 16, 1962    11 Sheets-Sheet 1
INVENTORS
FRED A. GUNN
HORTON H. MORRIS
BY
ATTORNEYS

INVENTORS
FRED A. GUNN
HORTON H. MORRIS
BY

ATTORNEYS

EFFECT OF PARTICLE SIZE DISTRIBUTION
ON GLOSS OF COATED PAPER

EFFECT OF PARTICLE SIZE DISTRIBUTION
ON OPACITY OF COATED PAPER

United States Patent Office 3,171,718
Patented Mar. 2, 1965

3,171,718
DELAMINATED DOMESTIC SEDIMENTARY CLAY PRODUCTS AND METHOD OF PREPARATION THEREOF
Fred A. Gunn, Gordon, and Horton H. Morris, Macon, Ga., assignors, by mesne assignments, to Freeport Sulphur Company, New York, N.Y., a corporation of Delaware
Filed Feb. 16, 1962, Ser. No. 173,762
24 Claims. (Cl. 23—110)

This invention relates to improvements in domestic sedimentary clay products for coating and other uses, and includes new clay products with distinctive particle size, shape and distribution, of high brightness and whiteness and improved gloss, and an improved process of producing them.

This application is a continuation-in-part of our prior applications Serial No. 778,030, filed December 3, 1958, and Serial No. 809,125, filed April 27, 1959, both abandoned.

Domestic coating clays, used extensively in the paper industry, are made from Georgia sedimentary kaolin clays by settling or separation treatments which remove from the clay the grit and coarser particles above a predetermined size. High grade coating clays are made by separating coarser clay fractions so that the coating clay will contain around 80% or 90% of particles less than 2 microns in size.

Domestic clays are sedimentary clays and are distinguished from English clays which are primary clays imported from England. When English clays are referred to, it will be understood that they are primary clays, and when domestic or Georgia kaolin clays are referred to, it will be understood that they are domestic sedimentary clays.

Such domestic coating clays are sold in competition with imported English clays which find ready acceptance because of their brightness advantage, generally 1 to 3 points over domestic coating clays, and particularly because of the whiter appearance which they impart to a filled or coated sheet. English clays thus frequently have a G.E. brightness of 90 or more, whereas the highest values obtained with domestic coating clays, even after bleaching, are generally 1 to 3 points or more lower than 90.

English clays have a distinctive white color and give a coated paper sheet with a white color, whereas domestic clays will give a yellow-white or cream-colored sheet when compared to the sheet made with English clay. This difference is readily observable to the eye. The papermaker can add blue dyes to the coating color formulation (made up of clay plus a binder such as casein or starch plus additives) and thus obtain the desired blue-white or less yellow sheet of paper, but in doing so the brightness of the sheet is decreased.

Because of the advantages of brightness and color, many paper mills use the English clays, even though in some respects, such as their poor rheological characteristics, they have less desirable properties.

It is well known, in fact is the basis of determining grades, that finer particles size distribution improves the paper coating characteristics of clay. Thus, in both the English and domestic clay industry, several grades of coating clays are produced and the particular grade is determined primarily by the percent of particles below two microns in size. A #1 coating grade of clay (English or domestic) will generally have 90–100% of its particles below two microns, a #2 coating grade will have 80–85% of its particles below two microns and a #3 coating grade will contain perhaps 70% of its particles below two microns. A clay that contains 55% or less of its particles below two microns, is generally sold as a filler clay, although there is some overlapping in these fields. In fact, the highest grade coating clays may sometimes be used as fillers while a relatively coarse filler clay may sometimes be used as a coating pigment. The production of the finer particle sized grades is expensive, since much (30–70%) of the starting clay is of coarser particle size and, therefore, is either discarded or, more generally, is sold at a low price as filler clay.

It is generally considered, in the coating clay industry, that there is a critical value of about 2 microns for clay particles, that is, clay particles below 2 microns are predominantly single, flat, hexagonal plates, while clay particles coarser than 2 microns are strongly bound stacks or aggregates. The particle sizing of clay is commonly effected by the so-called sedimentation method, and the size of the clay particles is expressed in terms of equivalent spherical diameter, as determined by this method. Electron-micrographic methods are stated to confirm these results. See TAPPI Monograph Series, No. 20, "Paper Coating Pigments," published 1958, pp. 71–77; Kirk Othmer, "Encyclopedia of Chemical Technology," published 1949, vol. 4, pp. 65, 68.

It is also recognized that the platelets of around 2 microns in size and smaller have a thickness of around $\frac{1}{10}$ their diameter, but that particles above 2 microns are not platelets but are aggregates or stacks which are much more nearly isometric in shape than the single plate particles and are present as so-called "stacks" or "booklets" or aggregates (TAPPI reference, supra, pages 73–75).

The present invention provides an improved domestic sedimentary clay for coating or other purposes with a G.E. brightness of the unbleached product of 88 or higher, and of the bleached product of 90 or higher, and with a white color comparable with that of British clays, as well as with improved gloss and other desirable properties. The new clay, on calcination, gives a calcined clay of unusually high brightness of about 95 to 99, and a remarkably low abrasion index of below 100.

A particularly valuable delaminated product is produced by the delamination of coarse filler clays, made up largely of stacks or booklets, and containing not only platelets of less than 2 microns in size but substantial amounts of larger platelets up to and above 5 microns in size, by electron micrographic measurement, and which have unusual properties, as hereinafter pointed out.

An improved domestic coating clay product is made by subjecting conventional sedimentary coating clays to delamination to produce coating clay products which are distinguished from conventional products by the absence of stacks or booklets of more than 2 microns in size, and by the presence of thin platelets of more than 2 microns in size.

Some of the properties of the new delaminated products produced depend with the particular starting materials which are subjected to delamination.

When the new delaminated clay products are produced by subjecting coarser domestic filler clay fractions, made up principally or largely of booklets or aggregates, to delamination, the resulting delaminated products contain considerable proportions of large platelets of more than 2 microns in size, and also more than 5 microns in size, and with a thickness of these larger platelets of around 0.2 to 0.4 micron, by electron micrographic measurement. In producing such products, the starting materials of the present process are coarse Georgia sedimentary kaolin clay fractions composed in the main of booklets or aggregates of clay platelets. Such coarse clay fractions are obtainable in the process of milling clay after first separating the sand and grit and coarser particles and after further separating the clay to remove most of the finer clay particles therefrom. These coarser fractions may contain small amounts of clay of less than 2 microns in particle size, but will be made up mainly of larger particles in the form of aggregates or booklets of over 5 microns in size and, to a considerable extent, of particles which may exceed 10 microns in size. Such a coarse clay may contain, for example, 52% over 5 microns and below 20 microns, and 15% below 2 microns.

When conventional coating clays are used as the starting material for the present process, improved products are obtained which are free from stacks or booklets, but which contain a considerable amount of platelets of more than 2 microns in size, and which are equal to or excel the English coating clay in paper making qualities. The production of domestic clays with brightness values of 90 or above has thus been accomplished in a practical manner for the first time to our knowledge, while the good qualities normally associated with domestic clays (good adhesive demand, excellent rheological properties) have been retained or even improved. In addition, a startling increase in gloss, even at relatively coarse particle size distributions, has been obtained. Products that would normally be considered #2 or #3 coating grades of clay on the basis of their particle size distribution exhibit gloss values seldom attainable even with #1 coating grades. A significant increase in opacity is also obtained when clays are subjected to the delamination procedure of the present invention, and this point can be of importance in reducing the amount of coating required to obtain a given hiding power; of particular interest, for example, to a paper or board manufacturer concerned with mailing costs.

The improved process of the present invention is a delamination process in which the coarse filler clays, or the domestic coating clays, are subjected, under conditions protecting them from contamination by abrasion, to a fine milling mechanical action which can be visualized as being a combination of (1) mild viscous shear milling due to agitation of the viscous mass composed of fine milling media, water and clay; (2) mild percussive milling due to the multiplicity of low inertia impacts offered by the collisions of the fine milling media with itself and with the clay– and (3) mild frictional milling produced by the combination of rubbing action of the fine media to itself and of the fine media to the clay. These three actions occur simultaneously and are mutually cumulative in effectiveness in bringing about delamination of the coarse clay booklets or aggregates of coarse filler clays, or delamination of the smaller stacks or aggregates of conventional coating clays, and the production therefrom of improved delaminated clay products which are free from stacks or aggregates or booklets, and which contain clay fractions of greater than 2 micron size in the form of platelets. Care should be taken to protect the clay during milling from contamination by abrasion or otherwise.

We have found that the desired delamination can be advantageously effected by the use of non-abrasive resilient plastic grinding media, such as beads or pellets of nylon, styrene-divinyl benzene copolymer, or other plastic material, acting as a fine milling medium, and which advantageously has a specific gravity less than that of the clay slurry, so that the pellets tend to rise to the top of the slurry when the agitation is stopped.

The delamination of the coarse clay, or of the coating clay, while in suspension in water and under the action of the fine milling media, is continued until the coarse clay stacks, or booklets of the coarse clay, or the stacks or booklets of the coating clay, are delaminated and converted into platelets, and to produce a product free from stacks or booklets, which is directly of the desired particle size, e.g., for use as a coating clay, or of a size which, after further classification or purification by settling, can be so used.

The process of delamination can be carried out as a batch process or as a continuous process, with regulation and with continuation of the delamination until the clay stacks or booklets have been delaminated to a product with platelets of the desired thickness and diameter. Thus, in the batch operation, the coarse clay in a dispersed condition in an equal weight of water can be admixed with nylon pellets of about $\frac{1}{10}$ inch in diameter and $\frac{1}{10}$ inch long, and of a weight of about 5 parts of nylon for 3 parts of the coarse clay, and subjected to the combined shear, percussive and frictional milling by a vigorous agitation of the suspension of coarse clay and nylon, and continuing the process until the desired delamination of the clay particles has taken place.

The process of delaminating the clay is advantageously carried out in a continuous manner with the use of the fine milling media, such as small balls, cylinders, beads or pellets of nylon, styrene-divinyl benzene copolymer, polyethylene or other plastic, acting upon a suspension of the coarse clay in water. In the continuous delamination, the clay is fed continuously into the delaminating apparatus and the discharge from the apparatus is advantageously combined with a fractionation of the clay to return the coarser clay to the apparatus while removing only the clay of the desired particle thickness and diameter. This selective takeoff of the thinner clay particles, while returning the coarser clay to the vessel in which the delamination is taking place, has the advantage that the finer clay that may be admixed with the coarse clay fed to the apparatus is continuously being removed at the same time that the clay produced by the delamination is being removed, so that the clay remaining in the apparatus during the continued operation is made up mainly of the thicker clay particles which are undergoing delamination and which are being continuously freed from thinner clay particles by the selective drawoff and fractionation and return of coarser clay particles.

This continuous drawoff of clay suspension, separation of clay product and return of coarser clay to the apparatus is also advantageously continuous and can be accomplished by subjecting the withdrawn clay to a centrifugal separation with return of the coarser clay to the apparatus, or by the use of one or more cyclone separators which will separate the product fraction and return the coarser clay to the apparatus.

The use of a fine resilient plastic grinding media such as nylon or other plastic has the advantage that objectionable abrasion of the apparatus is avoided, so that steel apparatus can be used without objectionable contamination of the clay.

In the batch-wise or continuous operation of the process, the delaminating is effected by a rapid agitation or flow of the fine grinding media, e.g., nylon, with the clay in suspension, to accomplish the combined shear, percussive and frictional milling action above referred to.

The delamination process not only converts the stacks or booklets into platelets but it frees or releases discoloring impurities which can be removed by sedimentation or centrifugation or by other means during the process (as in continuous operation) or after delamination is complete. The impurities are usually titanium-containing mineral (e.g., anatase, rutile) and/or iron-containing minerals (e.g., ilmenite). These impurities are heavier than the clay particles and will settle out on standing, or by centrifugation, to give a delaminated product low in such impurities. Such settling steps are illustrated in Examples 2, 3, 5, 9 and 10, and analyses are given in Examples 9 and 10. The release and removal of such impurities, when present, results in better color and brightness of the product.

While the stacks or booklets are mainly those above 2 microns, some smaller booklets may be present which are less than 2 microns, or even less than 1 micron, and these will also be delaminated to platelets; while the platelets present in the clay may have their surfaces improved by the treatment to which they are subjected during the delamination treatment.

The essential difference between the products of the present invention and conventional coating clays is illustrated by Table I, which gives the average diameter, thickness and ratio of diameter to thickness, of a number of ranges of sizes of particles, of both conventional clay and delaminated clay, as measured from electron micrographs.

The electron micrographs were made through use of an R.C.A. EMU-2 electron microscope. Samples were prepared by placing the dispersed clay in water on a collodion covered grid and allowing the water to evaporate. The collodion had previously been treated with a small amount of serum albumin, which aids in retaining the dispersed state of the clay particles when the water evaporates. After the clay was dry, a small amount of a very dilute suspension of 0.25±0.01 micron latex spheres was added to the grid. These latex spheres serve as a diameter and thickness internal size calibration standard. The samples were then vacuum shadowed with a thin layer of metallic platinum. Since the height of the shadow in the resulting electron micrograph is proportional to the thickness of the particle, both the particle diameter and thickness may be measured.

These two methods, however, give quite different results, when applied to the delaminated products of the present invention, for products which, by the TAPPI method show a high percentage by weight of less than 2 micron particles and a small percentage above 5 microns, show by electron micrographic measurement, a high percentage by weight of particle of more than 2 microns.

The decrease in particle thickness seems to be the explanation of the abnormally high gloss characteristics and of the high opacity of the delaminated products, as illustrated in Table II.

Table II gives the particle size distribution, by the TAPPI or sedimentation method, of a sample of domestic filler clay and of the three grades of domestic coating clays (No. 3, No. 2 and No. 1), and of four delaminated coarse clay products, and also gives the calendered gloss and sheet opacity.

TABLE II

| Description | Particle Size Distribution (Equivalent Spherical Diameter) | | | Calendered Gloss | Sheet Opacity |
|---|---|---|---|---|---|
| | +5 microns | −2 microns | −1 micron | | |
| Domestic Filler Clay | 46 | 24 | 16 | 28.9 | 92.1 |
| #3 Domestic Coating Clay | 7 | 70.5 | 51 | 41.4 | 93.4 |
| #2 Domestic Coating Clay | 4 | 82 | 62 | 50.7 | 94.2 |
| #1 Domestic Coating Clay | 0 | 92 | 76 | 60.9 | 94.3 |
| Delaminated Clay | 11.5 | 48 | 34 | 54.7 | 94.0 |
| Do | 3.0 | 70 | 53 | 62.4 | 94.5 |
| Do | 0 | 76 | 55 | 69.4 | 95.0 |
| Do | 0 | 93 | 72 | 70.5 | 94.9 |

The first two delaminated clays are the products of Example 8. The third delaminated clay is similar to that of Example 6, and the fourth is the product of Example 5.

In opacity, the delaminated clay products are better than the conventional domestic coating clays of compa-

TABLE I

| Particle Size Range Diameter, in Microns | Ave. Diameter | | Ave. Thickness | | Diameter/Thickness Ratio | |
|---|---|---|---|---|---|---|
| | Conventional | Delaminated | Conventional | Delaminated | Conventional | Delaminated |
| 0.01–0.50 | 0.271 | 0.273 | 0.0326 | 0.0347 | 8.31 | 7.87 |
| 0.51–1.00 | .679 | .715 | .0727 | .0690 | 9.34 | 10.36 |
| 1.01–2.00 | 1.37 | 1.44 | .171 | .122 | 8.04 | 11.8 |
| 2.01–3.00 | 2.40 | 2.44 | .467 | .181 | 5.14 | 13.5 |
| 3.01–5.00 | 4.04 | 3.55 | .713 | .206 | 5.67 | 17.2 |
| 5.01–10.00 | 7.03 | 6.48 | 2.77 | .328 | 2.54 | 19.8 |

Table I shows that the particles of conventional clay of more than 2 microns have a thickness far greater than that of the delaminated particles of the same diameter, which represents the difference between booklets or stacks in conventional clay and the thin platelets of the delaminated clay.

The ratio of diameter to thickness is far greater for the delaminated clay above 2 microns in size.

The above table does not attempt to make comparisons of particles above 10 microns, which in conventional clay are stacks or booklets and in the delaminated clay are large thin platelets. FIGS. 3 and 4 of the drawings, hereafter referred to, show graphically the difference in size and diameter of the particles, including particles of more than 10 microns.

Table I is based on measurements of several thousand particles, and the particle sizes are measured sizes, measured from electron micrograph, as distinguished from measurements by the TAPPI or sedimentation method. This latter method is the method commonly used in the art, and is the classification method referred to elsewhere in the present application, unless measurement by the electron micrograph method is indicated.

rable particle size distribution (by the TAPPI method), while the much coarser delaminated clays are comparable in opacity with the finest (#1) conventional coating clay.

In calendered gloss, the delaminated products give a radical improvement for products of comparable particle size distribution.

Another surprising property of the new coating clay, when made by delamination of coarser clay, is that, when subjected to calcination, it gives a calcined clay product with an unusually high G.E. brightness, around 95 to 99, and an unusually low abrasion index, below about 200 and in some cases below about 100 by the modified testing method hereinafter described and below about 60 by the common abrasion testing method.

A similar point of difference is shown between the delaminated and non-delaminated conventional coating clays by the higher brightness and lower abrasion value given by delaminated coating clays when they are calcined.

It is known that coating clays and filling clays can be converted into products of higher brightness by calcination, but the resulting calcined products have an abrasion index so high as to prevent their use for many purposes.

But the new calcined clay products of the present invention, which are made from the new delaminated coating clay products, combine unusually high brightness with a low abrasion index.

The invention will be further described in connection with the accompanying drawings, in which FIG. 1 illustrates, in a somewhat conventional and diagrammatic manner, and in vertical section, an apparatus for carrying out the process of the invention and for producing the new delaminated clay products of the invention;

FIG. 2 illustrates on an enlarged scale one of the fine grinding elements;

Figure 4:
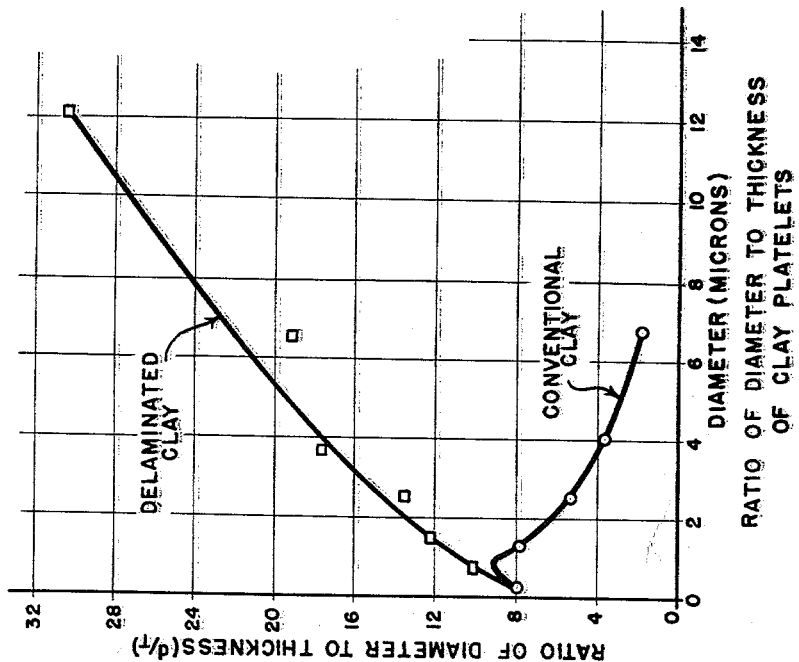
FIG. 4 shows the ratio of diameter to thickness of particles of conventional clays and of the delaminated clays of the present invention, as determined by electron micrographic measurements.

The apparatus illustrated is made up of a tank or vessel 1 having a rotating agitator 2 therein mounted on the shaft 3 which is supported by bearings 4 and 5 and rotated by the motor 6 and the belt 7, which passes over a pulley 8 on the motor and a pulley 9 on the shaft. The agitator 10 is cylindrical in shape of, e.g., 6 inches in diameter and 6 inches high and with six slots ⅜ inch in width around the cylinder.

The feed of the clay suspension containing, e.g., equal proportions of water and clay, is through the inlet trough 11 from the pipe 12 having flow regulating valve 13 therein.

The outlet from the tank 1 is through an outlet 13–A covered with 60-mesh screen and through the line 14 to the pump 16 operated by motor 17 and which discharges the clay suspension through the line 18 into the first of a series of three cyclones 19, in which separation of coarser and finer clay particles takes place, with the coarser clay flowing back to the trough 21 and the finer clay passing through the line 20 to the second cyclone 23, where a similar action takes place, with the finer clay passing through the line 24 to the third cyclone 25, from which the coarser clay is returned to the trough 21 and the finer clay passes through the line 26 to the receptacle or tank 27. The coarser clay fractions separated in the cyclones return through the troughs 21 and 22 to the vessel 1.

The fine grinding media illustrated is in the form of cylinders of nylon ⅒ inch in diameter and ⅒ inch long, one of which is shown magnified in FIG. 2. Only a few of these nylon cylinders are shown in the tank 1, and their size is somewhat exaggerated, but it will be understood that in practice the entire tank will be filled with these to an extent such that during the rapid agitation of the admixture of the clay suspension and the nylon elements, there will be continuous and intimate delaminating action by the combined shear, percussive and frictional milling above referred to. For example, 5 parts by weight of the nylon pellets and 6 parts by weight of a 50/50 clay-water suspension or slurry is illustrative of the relative amount of the fine delaminating elements and of the clay subjected to their action.

The tank 1 can be lined with polyethylene or other material, but it is one advantage of the use of the non-abrasive fine grinding media such as nylon that a steel apparatus can be used.

In the operation of the process and with an apparatus such as illustrated, and an agitator of the size described, the agitator will be rotated at a rapid rate, e.g., around 1750 r.p.m., with resulting rapid and intense movement and action of the combined character above referred to, involving shear milling, percussive milling, and frictional milling to bring about the desired delamination of the coarse clay particles.

The apparatus illustrated can be operated as a batch apparatus with the charge of the clay introduced together with the nylon elements and with rapid agitation and resulting delaminating action until the coarse clay has been converted into the desired thin clay platelets.

The apparatus can advantageously be operated as a continuous apparatus with continuous feed of the clay suspension in regulated amount through the trough 11 and with continuous removal of clay through the screen outlet and separation of the thinner or finer desired clay through the multi-stage cyclones, while returning the coarser clay particles for further delamination.

This continuous method of operation has the advantage that small amounts of fine clay entering the apparatus with the coarse clay are continuously removed along with the thin clay platelets from the delaminating treatment, while the coarser clay particles are continuously subjected to delamination with the minimum amount of the finer clay particles in admixture therewith.

The fine clay resulting from the delaminating treatment, and of a particle size suitable for coating clay, is further subjected to a bleaching treatment such as is commonly used in bleaching present-day coating clays.

Where the new coating clay product is to be further treated by calcining to produce a calcined product, the clay will be dried and pulverized before it is calcined and the calcining can be carried out in calcining furnaces with proper temperature control, as hereinafter described, followed by, e.g., a pulverizing of the calcined product to break up aggregates formed during the calcination.

Figure 3:
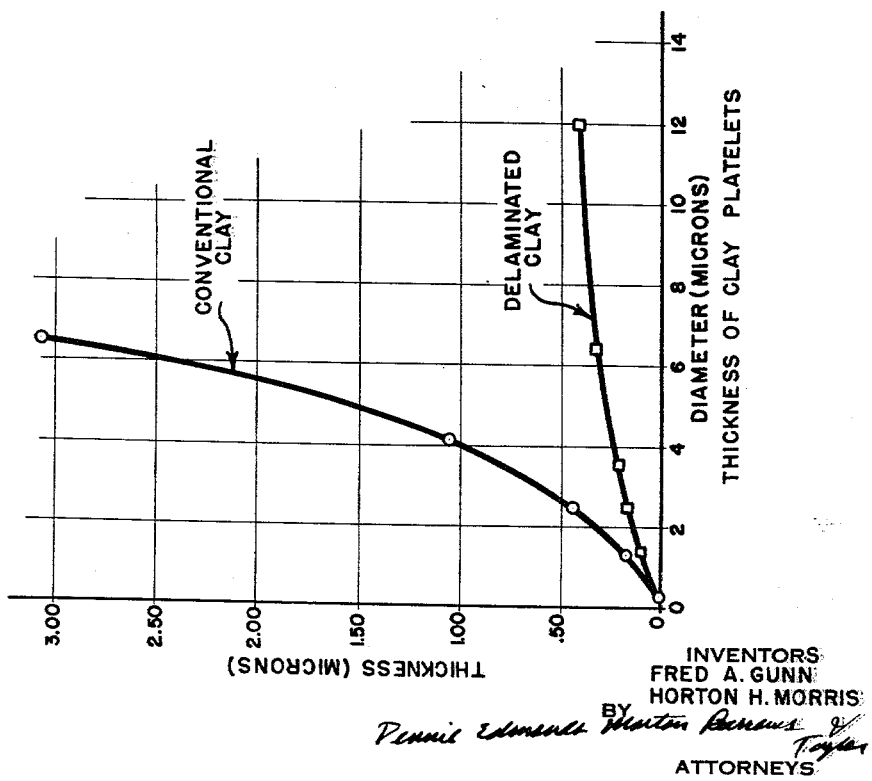
FIG. 3 illustrates the thickness and diameter of particles of conventional clays and of the delaminated clay products of the present invention, as determined by electron micrographic measurements.

The different nature of the delaminated products, as compared with conventional clay, is illustrated in FIGS. 3 and 4, which illustrate the differences shown in Table I.

The curve in FIG. 3 for conventional clay shows that, as the diameter of the particles increases above 2 microns, the thickness also increases. This illustrates the fact, which has been previously pointed out, that in conventional clay products the particles above 2 microns are predominantly stacks or booklets.

In contrast, the delaminated clay products of the present invention, when made from clays containing large stacks or booklets, include platelets up to 5 or 10 microns, or even more, with a thickness of these large platelets within the range of about 0.2 to 0.4 micron. This thickness of the large platelets is important in imparting improved properties to the product. This thickness is about one-half the wavelength of visible light (0.2–0.35 micron particles for the visible range of radiation of 0.4 to 0.7 micron).

The improved optical properties of the new products containing these large thin platelets appears to be due to this thickness of the large platelets, which is in marked contrast with the thickness of the platelets of conventional coating clays.

FIG. 4 illustrates the ratio of diameter to thickness of conventional clays and of the delaminated clay products of the present invention. With conventional clay the ratio decreases with increase in diameter of the particles above 2 microns, whereas with the delaminated clay the ratio increases very markedly with increase in diameter, and may be as much as 15 or 20, or 25 or 50, or even up to 120:1, or greater in some cases. Even with the large size platelets, produced from delamination of stacks or booklets made up of large size platelets, the thickness of the individual platelets is only about 0.2 to 0.4 micron.

Figure 5:
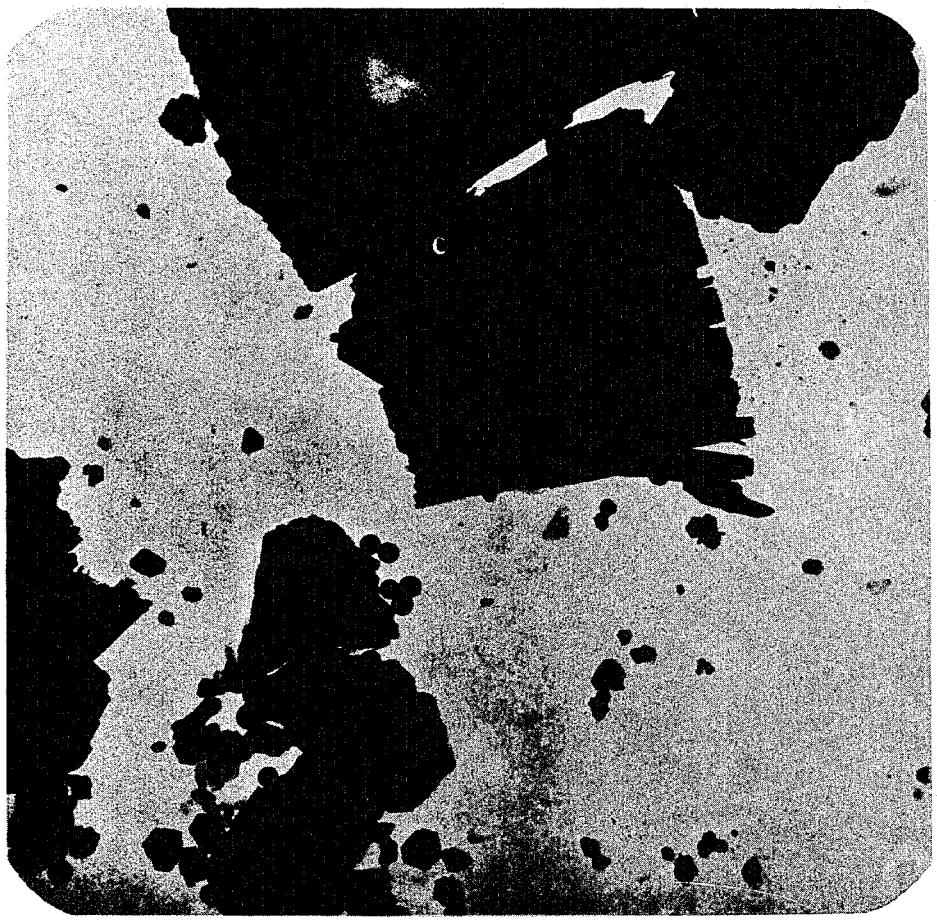
FIG. 5 is an electron micrograph showing particles of a coarse filler clay such as that used as a starting material in Example 6.
Figure 6:
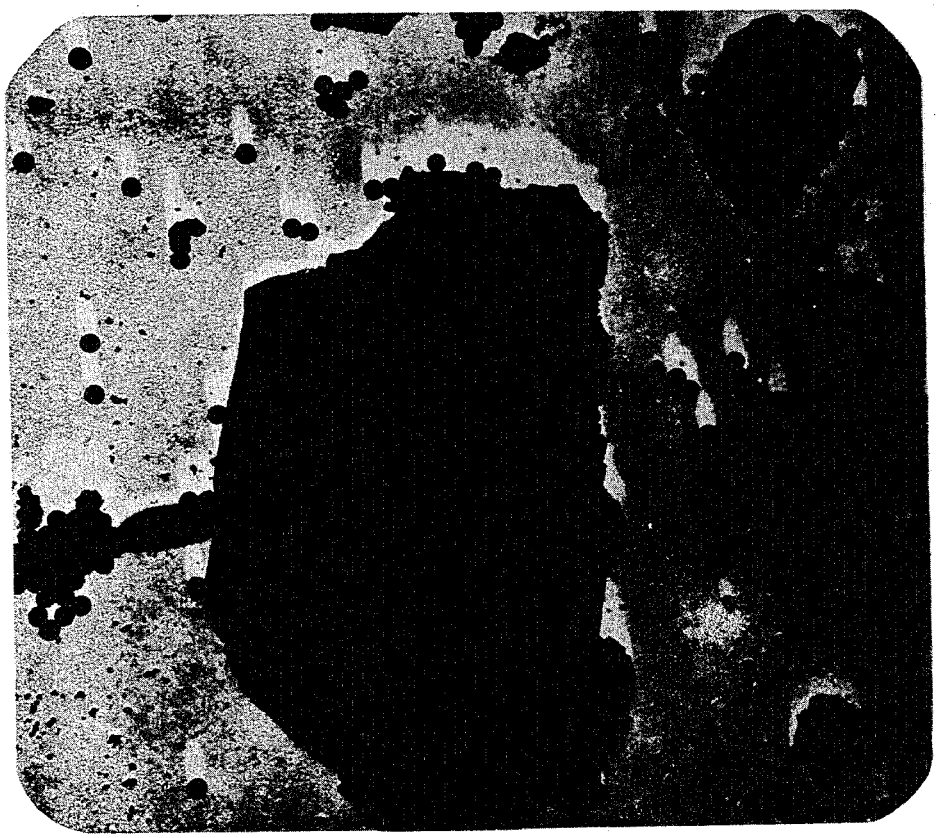
FIG. 6 is an electron micrograph showing a large platelet present in the delaminated product of Example 6.

FIGS. 5 and 6 are electron micrographs which illustrate respectively a coarse filler clay and the delaminated filler clay, these particular electron micrographs being taken from the starting material and product of Example 6. The magnification is approximately 15,000. The scale of one micron is shown on each of these figures. FIG. 5 shows stacks or booklets such as are present in large amounts in coarse filler clay. FIG. 6 shows one of the large platelets produced by delamination of this filler clay and also shows smaller platelets.

FIGS. 5 and 6 illustrate and show the importance of the new delamination process as applied to coarse filler clay to produce therefrom delaminated products which are free from booklets or stacks, or from broken-up booklets or stacks, and which contain the product in the form of platelets, including platelets of up to and greater than 5 microns in size and with a thickness of the large platelets of around 0.2 to 0.4 micron.

Figure 7:
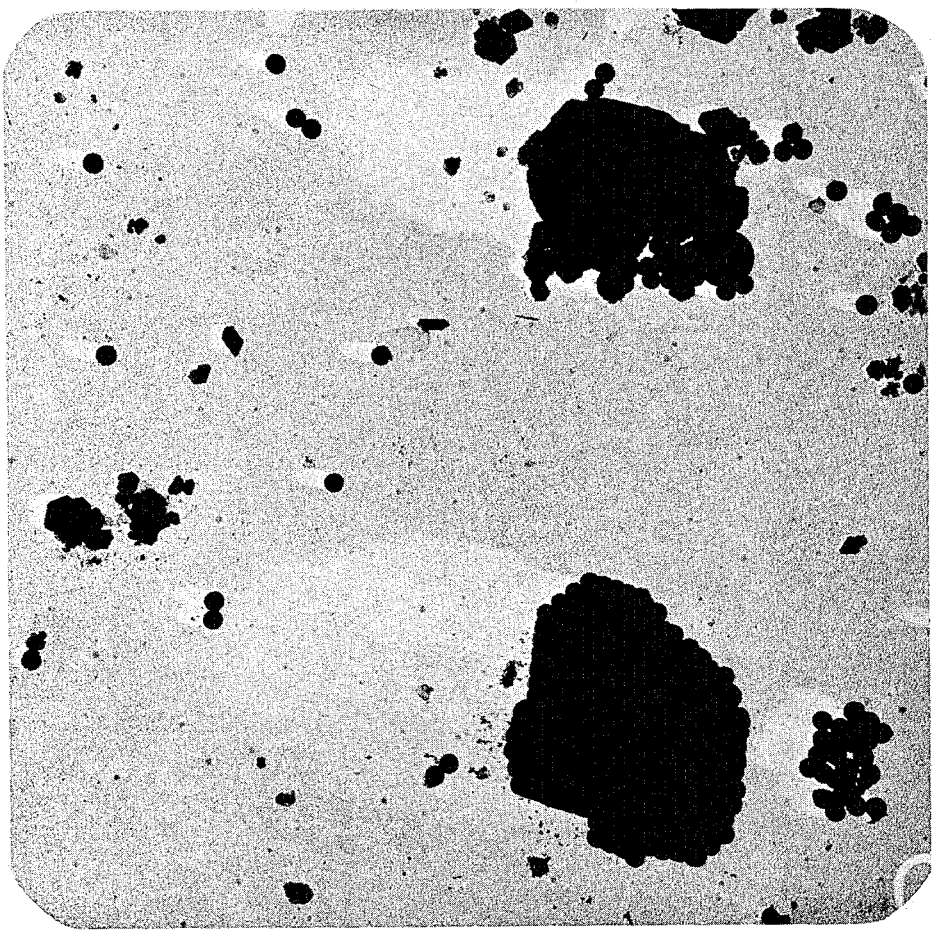
FIG. 7 is an electron micrograph of a conventional coating clay such as that used as starting material in Example 10.
Figure 8:
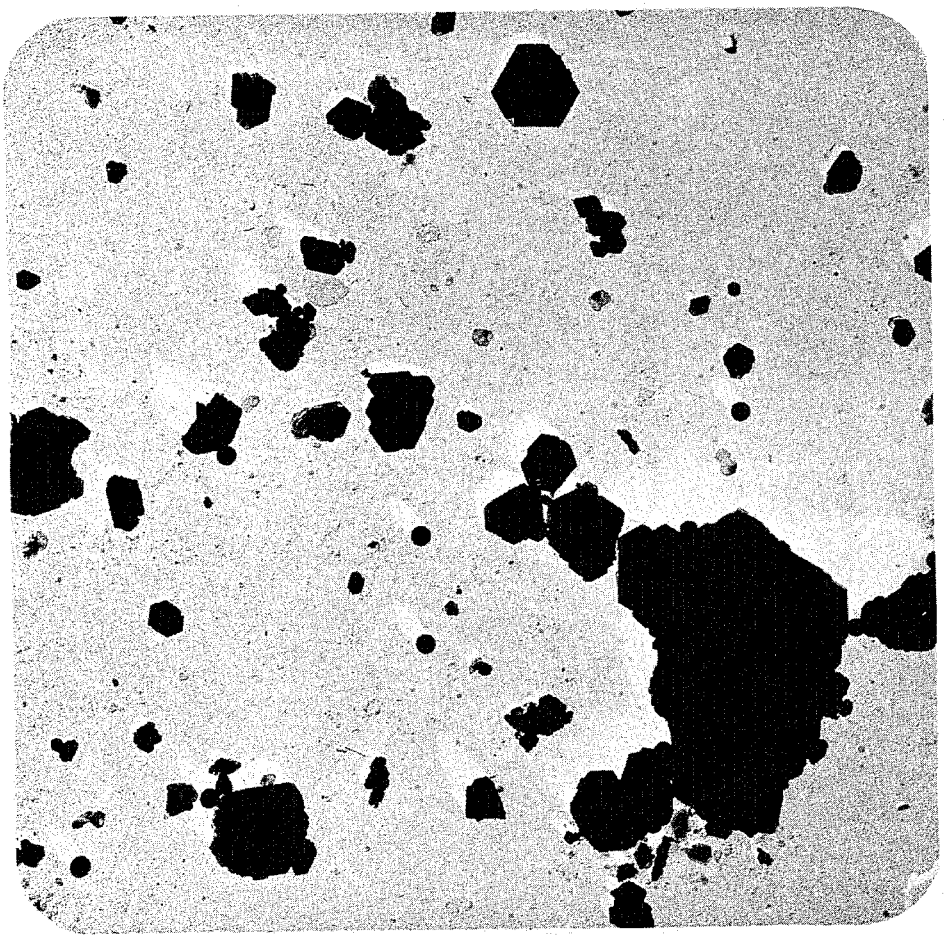
FIG. 8 is an electron micrograph of a delaminated clay product such as that of Example 10.

FIGS. 7 and 8 are electron micrographs which show a coating clay product before and after delamination. FIG. 7 shows a No. 2 coating clay such as that of Example 10 with stacks or booklets, and FIG. 8 shows the delaminated product with thin platelets of more than 2 microns in size.

FIGS. 7 and 8 illustrate the differences between conventional coating clay and the delaminated coating clay. Conventional coating clay, as is well recognized in the art, contains platelets of less than about 2 microns in size and stacks or booklets of more than 2 microns in size. The delamination of such coating clays converts the booklets into platelets and gives a product in which the particles of more than 2 microns in size are platelets, and a product which is free from stacks or booklets.

One of the important properties of clays is the gloss. Fineness of particle size has been considered essential for improvement in gloss and the highest gloss has been obtained with the finest coating clays.

Figure 9:
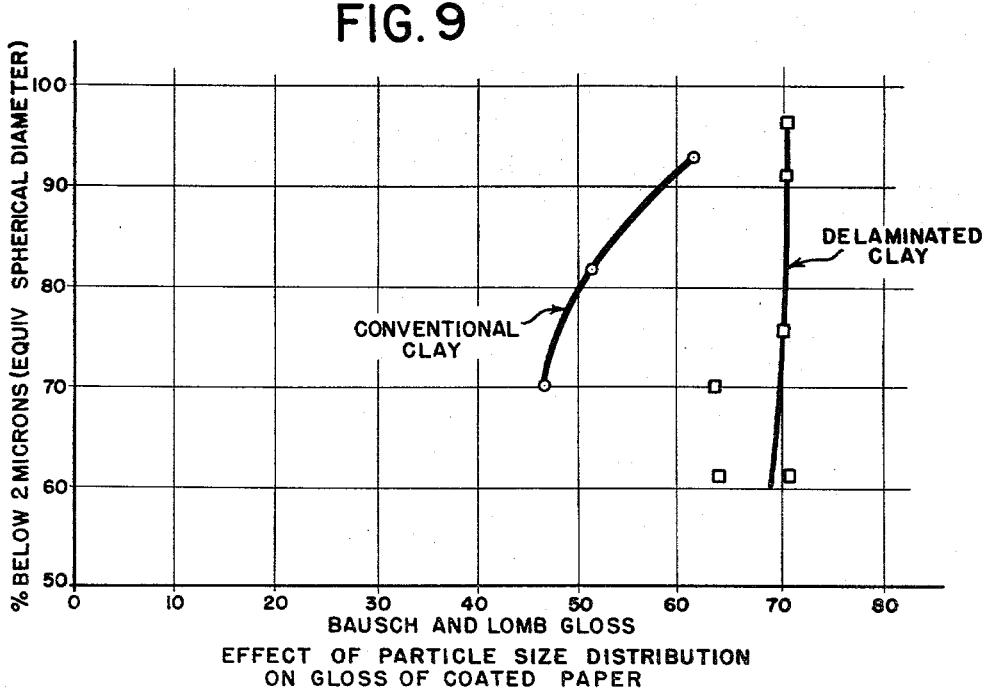
FIG. 9 shows a comparison of the gloss obtained with conventional clay and with the delaminated clay products of the present invention.

FIG. 9 shows a comparison of the Bausch & Lomb gloss obtained with conventional coating clays and with the delaminated clay products of the present invention.

The curve for conventional clay in FIG. 9 shows the increase of gloss obtained when finer particle size conventional clays are used to coat paper. Many such curves have been published in the literature to illustrate this point. See, for example, TAPPI Monograph, Series No. 20, page 80. This curve for conventional clay illustrates one of the major reasons for the present basis (i.e., percent below 2 microns) of determining the clay produced for sale to the paper industry. Present day clays coarser than about 70% to 80% below 2 microns are considered unsuitable for any fine paper coating operation, and such coarser clays are suitable for use only as filler grades.

The second curve of FIG. 9 shows that delaminated clays at least as coarse as 60% below 2 microns by the TAPPI method (T649 sm–54) give gloss values comparable to or better than those obtained through the use of the best present day domestic coating clays. A comparison of these curves also shows that with the finer delaminated clays a markedly higher gloss is obtained than with conventional clays.

Figure 10:
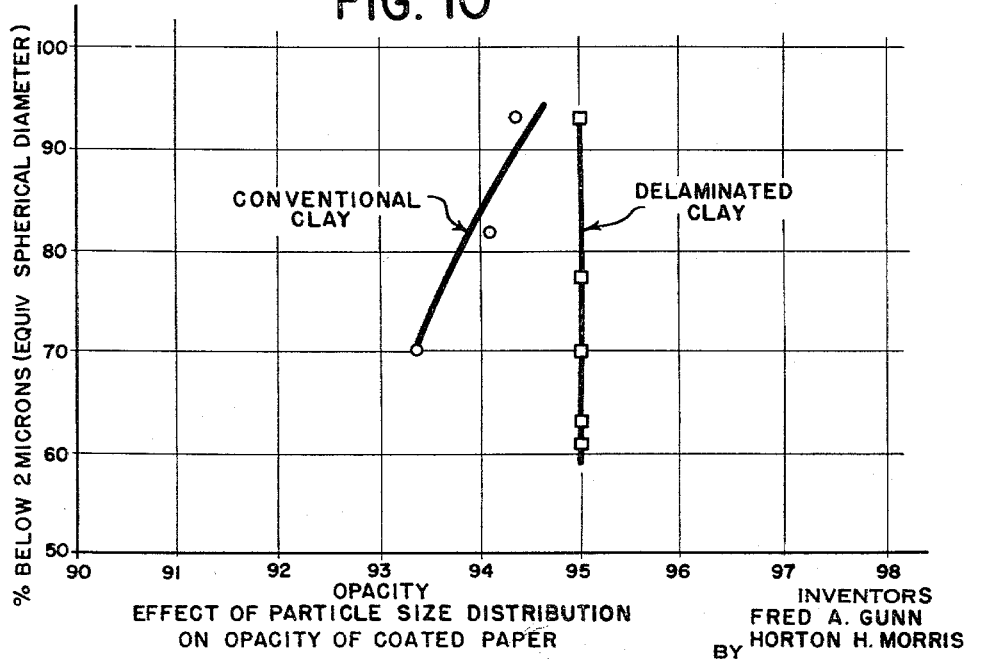
FIG. 10 shows a comparison of the opacity obtained with conventional clay and with the delaminated clay products of the present invention.

FIG. 10 gives opacity values for sets of paper sheets coated with conventional clays of varying particle size and with delaminated clays of varying particle size. With conventional clays the opacity increases with the increase in particles of less than 2 microns. With a delaminated clay, markedly higher opacity is obtained not only with the finer particle size but also with the larger particle sizes. It will be noted that a high opacity is obtainable from relatively coarse delaminated clays as well as from finer delaminated clays.

The paper sheets were all coated and calendered under the same conditions with equal amounts of the particular clay and adhesive. Fifteen parts of casein to 100 parts of clay was used. The sheets were coated at 10 lbs./ream, using an air knife coater. The sheets were calendered at about 1800 p.l.i. The sheets coated with the delaminated clays were much whiter and brighter and exhibited excellent printing properties. Their color under wax or under varnish was much whiter than the sheets coated with any of the conventional clays.

Figure 11:
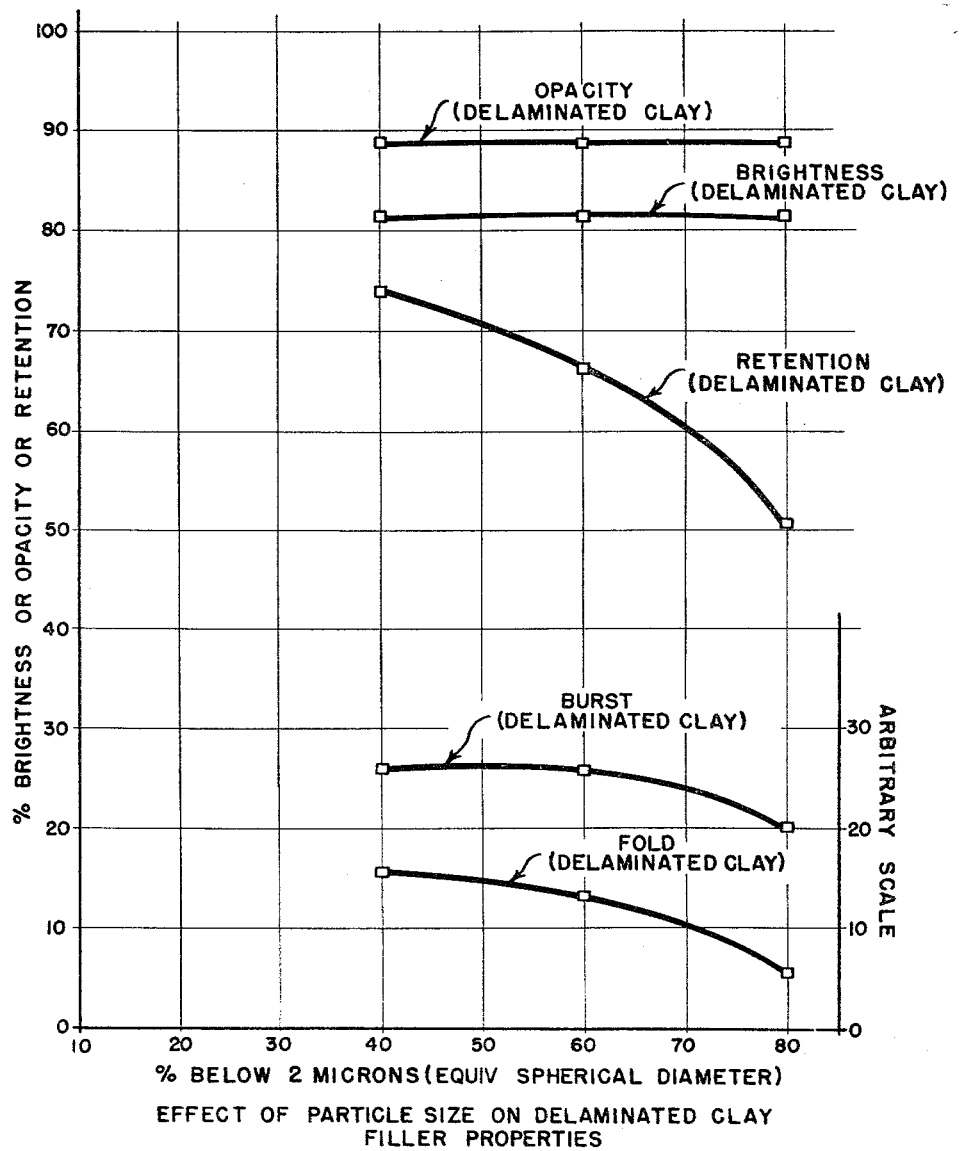
FIG. 11 shows the properties of the coarse delaminated products of the present invention when used for filling purposes.

Another unique feature of the new delaminated clays, when made from coarse filler clays, is illustrated by FIG. 11. When conventional clays of finer particle size distribution are used to fill a sheet of paper, increased brightness and gloss result, compared to regular coarse filler clays, but retention values are low and the strength (burst and fold) properties of the sheets are impaired to a greater extent than with filler clays. (TAPPI Monograph No. 19, TAPPI, N.Y., N.Y., pp. 71–76). The use of delaminated clays ranging widely in particle diameter gives filled sheets with the same opacity and brightness, since plate thickness is approximately the same in every case and this controls the optical values. The largest diameter delaminated clay could be used to obtain high retention values and maximum sheet strength. The flexibility of the large delaminated clay platelets may also aid in sheet strength retention and may be of particular interest in other applications.

The use of the large diameter platelets in coatings would present many fewer edges than would a fine coating clay, thus giving a surface of better sealing properties (i.e., less penetration by oils, etc.) which is of importance to many applications.

The new delaminated products are also useful and valuable for other purposes such as paint pigments, and purposes where high brightness and a white color are desired.

Figure 12:
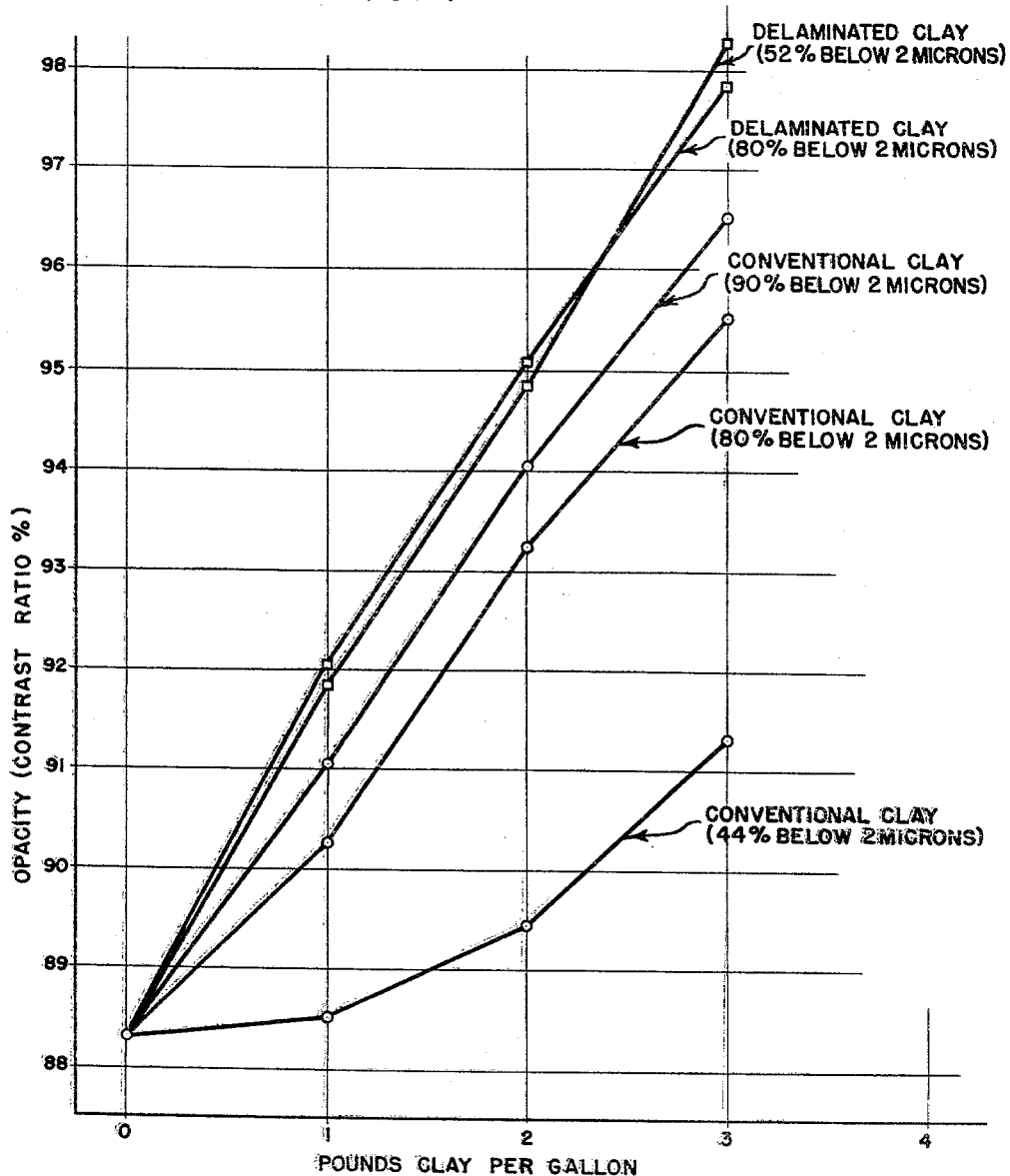
FIG. 12 shows a comparison of the delaminated products of the present invention with conventional clays of various particle size distribution in a latex paint.

The increased opacity obtainable because of the unique shape factor of limited thickness of the platelets and greater diameter is illustrated in FIG. 12 which shows a comparison, in a latex paint, of delaminated products of the present invention with conventional clays of various particle size distributions. The marked increase in hiding power (opacity) with increasing pigment fineness (i.e., in percent below 2 microns) when conventional clays are used can be noted. The delaminated clays, however, although differing widely in fineness (percent below 2 micron) gave substantially the same opacity.

By comparison, both samples of delaminated clay (see FIG. 12) showed better opacity than even the finest of conventional clays. The many fewer edges in the case of the delaminated clays should give better surface sealing properties (i.e., allow less penetration through the film).

The alkyd paint formulations used are given below:

*PVA_c latex paint formulas, 50% pigment volume concentration*

|  | Pounds per 100 Gallons | | | |
|---|---|---|---|---|
| Water | 208.0 | 208.0 | 208.0 | 208.0 |
| $K_5P_3O_{10}$ | 2.5 | 2.5 | 2.5 | 2.5 |
| Wetting Agent | 4.0 | 4.0 | 4.0 | 4.0 |
| Dispersant (25%) | 9.0 | 9.0 | 9.0 | 9.0 |
| Ethylene Glycol | 12.0 | 12.0 | 12.0 | 12.0 |
| Anti-Foam Agent | 2.0 | 2.0 | 2.0 | 2.0 |
| Carbitol Acetate | 5.0 | 5.0 | 5.0 | 5.0 |
| Methyl Cellulose (2%) | 100.0 | 100.0 | 100.0 | 100.0 |
| $TiO_2$ | 100.0 | 100.0 | 100.0 | 100.0 |
| Clay | 0.0 | 100.0 | 200.0 | 300.0 |
| $CaCO_3$ | 296.0 | 200.0 | 104.0 | 8.0 |
| $PVA_c$ Resin (55%) | 294.0 | 294.0 | 294.0 | 294.0 |

NOTE.—Pigment paste ground on high speed Stone Mill.

The following table shows a comparison, in an alkyd paint, of a delaminated clay product with a conventional calcined clay and a delaminated calcined clay:

*Comparison of contrast ratios, using various extenders, in an alkyd paint*

| Product | Percent −2 Micron | Contrast Ratio Percent | |
|---|---|---|---|
|  |  | 1-lb./gal. clay | 2-lb./gal. clay |
| Conventional Calcined Clay | 60 | 91.2 | 95.3 |
| Delaminated Clay | 52 | 93.2 | 96.3 |
| Delaminated Calcined Clay | 38 | 93.8 | 96.8 |

The alkyd paint used had the following composition:

*Alkyd resin paint formulas, 60% pigment volume concentration*

|  | Pounds per 100 Gallons | |
|---|---|---|
| $TiO_2$ | 125 | 125 |
| Clay | 100 | 200 |
| $CaCO_3$ | 375 | 275 |
| Vehicle | 520 | 520 |
| Solvent | 25 | 25 |
| Pb drier (24%) | 1.5 | 1.5 |
| Co drier (6%) | .5 | .5 |
| Anti-Skimming agent | 1.0 | 1.0 |

The increased opacity shown by the above table appears to be due to the dispersing and spacing action shown by the delaminated product on the $TiO_2$ present in the paint, since the similarity of the refractive index of the alkyd vehicle and the delaminated product (about 1.53 vs. 1.56) mitigates against the opacity increase being due to this factor. Stieg, "Official Digest," vol. 31, January 1959, No. 408, p. 55, points out that the ideal extender for $TiO_2$ in paint systems should have a size approximately ½ the wave length of the illuminating light (0.2–0.35 micron in the case of visible light), so that the $TiO_2$ particle can be separated by that distance. The thickness dimension of the larger platelets of the delaminated product is in this range.

Figure 13:
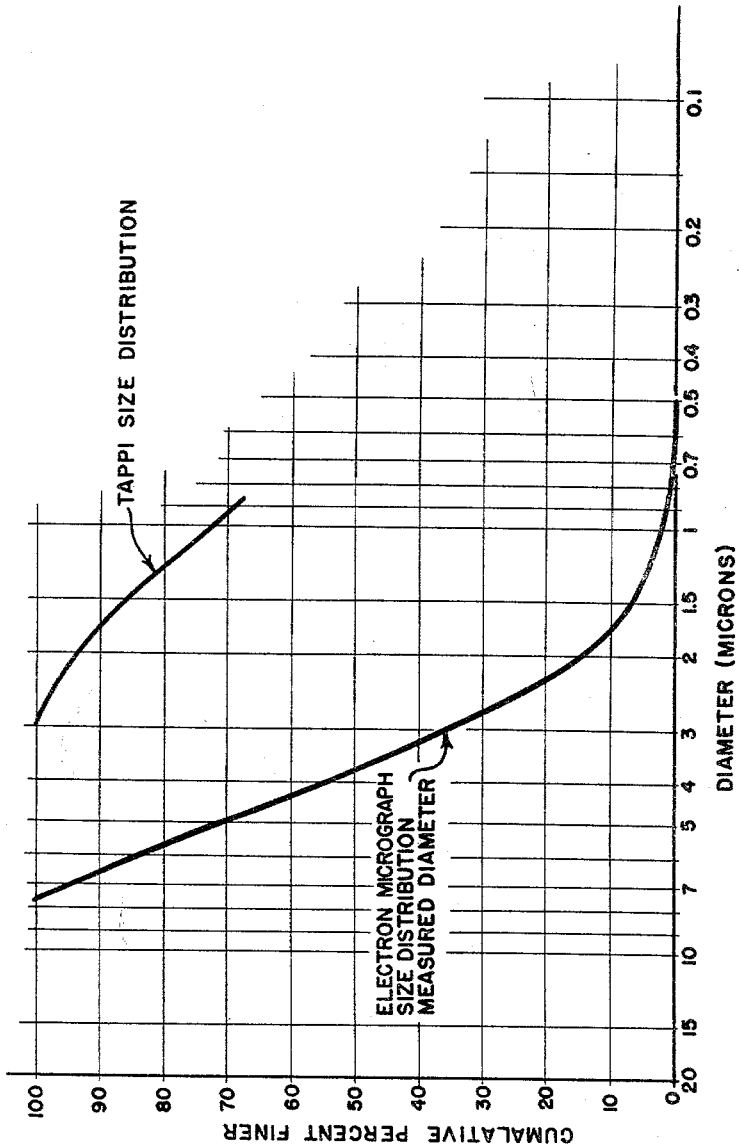
FIG. 13 shows a comparison of the particle size distribution by weight, of one product of the present invention by the standard TAPPI or sedimentation method, and by actual measurement by the electron micrograph.

FIG. 13 shows a comparison of the particle size distribution by the standard TAPPI or sedimentation method of the delaminated product of Example 5 in comparison with classification by actual measurement of the diameter and thickness of the particles on electron micrographs and calculation of the size distribution based on these measurements. While the TAPPI size distribution showed 0% above 5 microns, 93% below 2 microns and 72% below 1 micron, the weight distribution, based on actual measurements, showed approximately 30% by weight of particles greater than 5 microns and about 15% below 2 microns. The starting material showed 48% over 5 microns by the TAPPI method, while the delaminated product showed 30% above 5 microns by actual measurement. The starting material showed 20% below 2 microns by the TAPPI method, while the delaminated product showed about 15% below 2 microns. It is evident that the TAPPI particle size distribution method, while accepted for conventional clays, does not properly reflect the actual size distribution of the delaminated clay products resulting from the delamination of coarse clays.

Figure 14:
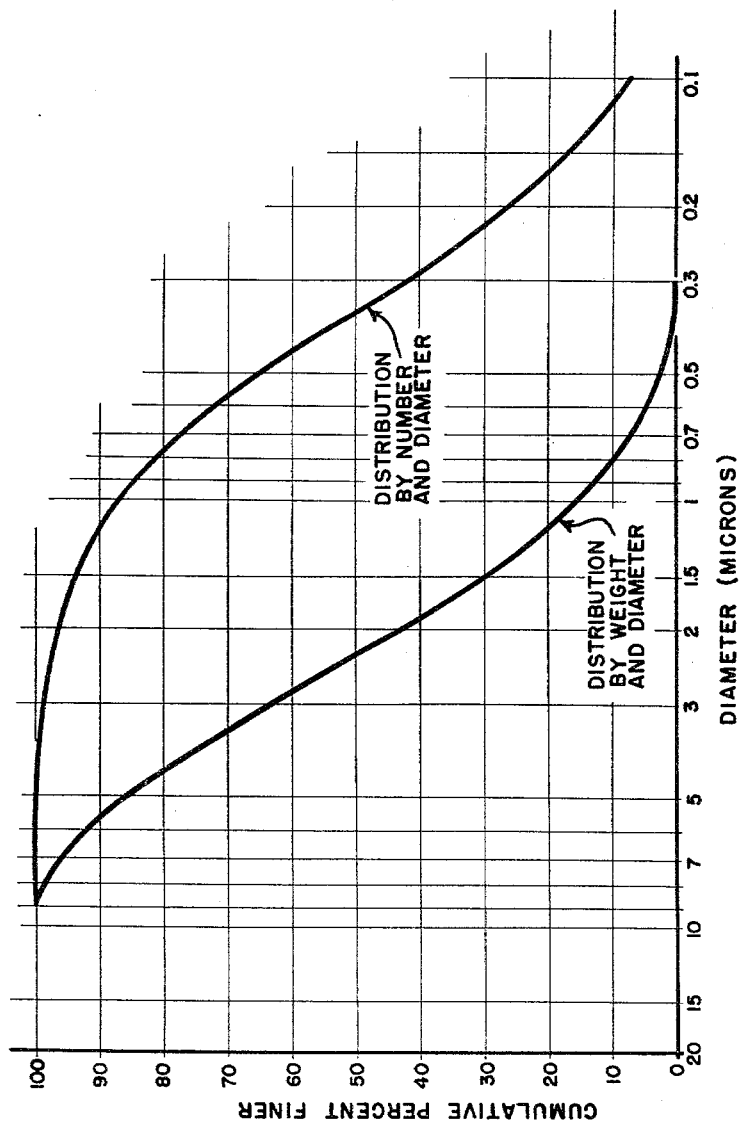
FIG. 14 shows a comparison of the distribution of the particles of a delaminated product by number and by weight, as determined from electron micrograph.

FIG. 14 shows two curves indicating respectively the distribution by number and diameter of particles as measured on electron micrographs, and the distribution by weight and diameter based on such measurements. These two curves reflect the fact that a large number of small particles represent a relatively small percentage of the weight of the product and that a relatively few large platelets represent a considerable proportion of the weight of the delaminated product. Thus, a single large platelet between 0.2 and 0.4 microns in thickness, and with a diameter of, e.g., 10 microns, may represent in weight the equivalent of 1000 or even several thousand of the finer particles of the product. From FIG. 14, it appears that around 87% of the number of particles are less than 1 micron in diameter, but that these represent only about 15% by weight of the product. Similarly, the number of particles less than 2 microns in diameter represent around 96% of the number of particles, but only about 40% of the weight of the product. The number of larger particles greater than 5 microns in diameter is so small that it is difficult to represent them by actual percentage on the curve. But the platelets of more than 5 microns in diameter represent around 15% by weight of the product.

FIGS. 13 and 14 illustrate the fact that where the clay treated contains large amounts of stacks or booklets, such as are contained in filler clays, or even in the coating clay of Example 1, the greater part by weight of the delaminated clay is made up of platelets of more than 2 microns in size by actual measurement.

The new delaminated products of the present invention, when defined in terms of their particle size by the TAPPI or sedimentation method, show a high percentage of particles less than 2 microns in size. But actual measurements, based on electron micrographs, show that the new delaminated products contain a large percentage by weight of platelets of greater than 2 microns in size, resulting from the delamination of clay stacks or aggregates of more than 2 microns in size. The TAPPI classification therefore is not a complete and reliable definition by itself of the new delaminated products; but a proper definition of the new products requires a classification or definition such as that obtained from electron micrographs which shows the absence of stacks or booklets in the product, and the presence of large proportions of platelets by weight of more than 2 microns. And where the products are made by the delamination of coarse filler clay the products contain a considerable proportion by weight of platelets in excess of 5 micons in size.

The invention will be further illustrated by the following specific examples, but it will be understood that the invention is not limited thereto.

EXAMPLE 1

This example illustrates the carrying out of the process on a laboratory scale.

The coarse clay used as the starting material was a coarse grade of filler clay which contained 52% over 5 microns, 16% below 2 microns and 12% below 1 micron. This coarse starting material had a G.E. brightness of 80.2.

The dispersed clay-water slurry was made of 800 grams of this coarse clay, 800 grams of water to give a suspension of 50% solids, and 2.5 grams, or 0.3% of the dry weight of the clay, of tetrasodium pyrophosphate. This slurry was placed in a 1-gallon glass jar, together with 1334 grams of nylon pellets of $\frac{1}{10}$ inch diameter and $\frac{1}{10}$ inch length, obtained from the National Aniline Division of Allied Chemical and Dye Corporation. The container was sealed and then shaken for 5 hours by the use of an oscillating "Red Devil" paint conditioner which operated at about 1100 cycles per minute. This apparatus is marketed by Red Devil Tools, Union, New Jersey.

At the end of this period, the nylon was removed from the slurry by means of a coarse screen. The slurry was diluted somewhat with water and poured through a fine screen of 325 mesh. The pH of the slurry was then adjusted to about 4–5 by the addition of sulfuric acid, and 2.008 grams of sodium hydrosulfite as a bleaching agent was then added. The resulting bleached clay product was recovered by filtration, dried and then pulverized.

This coating clay showed a G.E. brightness of 90.4. It had a white color comparable with that of English coating clay and in contrast with the yellowish cream or cream color of domestic coating clays.

In particle size, this product contained 3.5% above 5 microns, 64.5% below 2 microns, and 47% below 1 micron. It showed a remarkably high gloss of a coated sheet, uncalendered, of 15, whereas an ordinary domestic coating clay of comparable particle size showed a gloss of 6. The G.E. brightness of the coated sheet, uncalendered, was 79.4, a marked improvement over that of coated sheets coated with comparable domestic coating clays, and, in addition, the coated sheet had a white color instead of a yellowish or cream color.

An examination of this product under the electron micrograph showed freedom from stacks or booklets and the presence of platelets not only above 2 microns but also above 5 microns in equivalent spherical diameter, and these larger platelets had a thickness within the range of 0.2 to 0.4 micron.

EXAMPLE 2

The process was carried out and the product prepared in the same manner as in Example 1, except that the slurry, after removal of the nylon pellets, was diluted to 17% solids and allowed to settle one hour per inch of depth. At the end of this time, the slurry or slip was carefully removed from the coarser material which had settled out, and was then acidified, bleached with 0.0025 g. of bleach per gram of clay, filtered, dried and pulverized.

The particle size of the product so produced contained no particles over 5 microns, 90% below 2 microns, and 67% below 1 micron. This product had a G.E. brightness of 92.1 and a white color comparable with that of English clay. The gloss of a coated sheet, uncalendered, was 21, and the G.E. brightness of a coated sheet, uncalendered, was 81.1.

EXAMPLE 3

The same procedure and apparatus was used as in Example 1, with a coarse clay containing 48% over 5 microns, 20% under 2 microns and 12% under 1 micron, and with a G.E. brightness of 80.9 and a yellow-cream color which gave a gloss of a coated sheet, uncalendered, of 3.0 and a G.E. brightness of a coated sheet, uncalendered, of 72.7. The product was subjected to particle sizing as in Example 2, and the product had a particle size of 0% over 5 microns, 84% under 2 microns and 66% under 1 micron. The product, before bleaching, had a G.E. brightness of 89.4 and after bleaching, had a G.E. brightness of 90.5, was white in color comparable with British clay, gave a gloss of an uncalendered sheet of 17 and a G.E. brightness of a coated sheet, uncalendered, of 80.8.

Although the product by sedimentation showed 0% over 5 microns, an examination under the electron micrograph showed platelets having more than 5 microns in equivalent spherical diameter. The platelets greater than 2 microns and the larger platelets had an average thickness within the range of 0.2 to 0.4 micron.

EXAMPLE 4

This example illustrates a continuous process in which the coarse clay was dispersed in water at 30% solids using 0.4% tetrasodium pyrophosphate as the dispersing agent on the weight of the clay, and then mixed with nylon pellets of $\frac{1}{10}$ inch diameter and $\frac{1}{10}$ inch length to give a weight ratio of 5 parts by weight nylon pellets to 3 parts by weight of clay, dry basis.

The mixture was delaminated in the apparatus shown in the accompanying drawing, which permits the removal of delaminated platelets as they are formed and thus facilitates the delamination procedure, since delamination proceeds more rapidly when fewer platelets are present. The classification unit also allows selection of the particular grade of product desired, graded on a particle size distribution basis.

When this apparatus was operated with continuous withdrawal of a product containing 80–86% of its particles below 2 microns in equivalent spherical diameter, the product was found to have an unbleached G.E. brightness of 89.7, which is 3 to 6 points higher than that of an unbleached conventional domestic coating clay having an equivalent particle size distribution. After bleaching, the product had a G.E. brightness of 92.2.

The coarse clay used in this example contained 48% over 5 microns, 20% under 2 microns, and 12% under 1 micron. It had a G.E. brightness of 80.9 and a yellow color.

The unbleached product of 89.7 G.E. brightness and the bleached product of 92.2 brightness both had a white color comparable with that of British clay.

EXAMPLE 5

The same procedure and apparatus was used as in Example 4, with a coarse clay starting material similar to that in Example 4. The product obtained from the classification unit was subjected to further particle sizing as in Example 2 and was then acidified and bleached. After bleaching the product had a G.E. brightness of 90.9 and a particle size distribution of 0% above 5 microns, 93% below 2 microns, and 72% below one micron (equivalent spherical diameter). The product had an excellent white color. The particle size distribution by actual measurements of electron micrographs is illustrated in FIG. 13.

The material was carefully evaluated as a paper coating pigment, and was compared to a high grade English coating clay and to a high grade domestic coating clay coated under the same conditions.

The particle size distribution of the product of this example and of the domestic and English coating clays is given in Table III, together with the brightness, gloss and opacity of the calendered sheet, and the adhesive demand by the Dennison wax pick test.

The coating comparisons shown in the table were run under the same standard conditions, using fifteen parts of casein as adhesive to 100 parts of pigment. The sheets were coated by means of an air knife applicator and were calendered at about 1800 p.s.i. The calendered sheet gloss was determined on a Bausch & Lomb glossmeter.

TABLE III

| | Calendered sheet brightness | Calendered sheet gloss | Opacity of calendered sheet | Adhesive demand Dennison wax pick | Particle size distribution of pigment | | |
|---|---|---|---|---|---|---|---|
| | | | | | +5M | −2M | −1M |
| Product from Example 5 | 79.0 | 70.5 | 94.9 | 8½ | 0 | 93 | 72 |
| Domestic Coating Clay | 77.0 | 59.1 | 94.4 | 8 | 0 | 92 | 71 |
| English Coating Clay | 78.7 | 61.4 | 94.1 | 7½ | 2 | 80.5 | 68 |
| Product from Example 6 | 78.5 | 69.4 | 95.0 | 8 | 2 | 77 | 53 |

Table III indicates the unusually high gloss and brightness of a sheet coated with the product as compared to a sheet coated with a conventional domestic coating clay having about the same particle size distribution. The brightness of a sheet coated with the product is about the same as that obtained by use of an English coating clay.

EXAMPLE 6

The same procedure and apparatus as in Example 4 was used to treat a coarse clay having a particle size distribution of 55% above 5 microns, 16.3% below 2 microns and 11% below 1 micron (equivalent spherical diameter). The classification unit was so operated to give an effluent which had 2% of the particles above 5 microns, 77% below 2 microns and 53% below 1 micron in equivalent spherical diameter. The sample was acidified and bleached and was then evaluated as a coating material at the same time and in the same manner as described for the product from Example 5. The product, before bleaching, had a G.E. brightness of 89.1, and, after bleaching, had a G.E. brightness of 92.2, and had an excellent white color. The results of coating tests are given in Table III.

The unusually high gloss obtainable with this product is clearly illustrated in this example.

The improvement in adhesive demand and in opacity shown by the products from Examples 5 and 6, although slight, should be noted.

The classification by particle size distribution in Examples 5 and 6 is according to the common TAPPI or sedimentation method. When the products of these examples were examined under an electron micrograph they showed freedom from stacks or booklets, and the presence of thin platelets not only of more than 2 microns in equivalent spherical diameter, but also in excess of 5 microns, and with a thickness of the larger platelets within the range of 0.2 to about 0.4 micron.

The calculated average diameter of all of the particles of the product of Example 5 was 0.892 micron, as compared with a calculated diameter for a conventional No. 1 coating clay of 0.434. The calculated average thickness of the particles of the product of this example was 0.0774, as compared with 0.051 for a conventional No. 1 coating clay.

EXAMPLE 7

This example illustrates the use of Styrene Divinylbenzene Copolymer beads of about one thirty-second of an inch in diameter as the delamination media.

The coarse clay used as the starting material was a coarse grade of filler clay which contained 46% of its particles above 5 microns, 24% below 2 microns and 16% below 1 micron in equivalent spherical diameter, and had a G.E. brightness of 80.3.

A dispersed clay-water slurry was made of 1000 grams of this coarse clay, 1500 grams of water to give a suspension of 40% solids, and 3 grams, or 0.3% of the dry weight of the clay, of tetrasodium pyrophosphate. This slurry was placed in a 1-gallon glass jar, together with 1667 grams of Styrene Divinylbenzene Copolymer beads (8% crosslinked) of 18–30 mesh size, obtained from the Dow Chemical Company, Midland, Michigan. The container was sealed and then shaken for 8 hours on the "Red Devil" paint conditioner referred to in Example 1.

At the end of this period the beads were removed by screening and the sample was screened, acidified and bleached by the addition of 0.9 part of sodium hydrosulfite to 100 parts of product, in a manner similar to that described in Example 1.

The product had a G.E. brightness of 90.2. It had an excellent white color, comparable with that of English coating clay.

The product had a particle size distribution (equivalent spherical diameter) of 0% above 5 microns, 93% below 2 microns and 79.0% below 1 micron.

EXAMPLE 8

This example illustrates a batch process run on a larger scale, using the apparatus shown in the accompanying drawing, but without use of the classification equipment.

The apparatus was charged with a mixture of 65 lbs. of the coarse filler clay described below, 108 lbs. of the previously described nylon pellets, 142 lbs. of water and 0.26 lb. (0.4% based on dry clay weight) of tetrasodium pyrophosphate. The coarse clay used as feed had a G.E. brightness of 80.3, a particle size distribution (equivalent spherical diameter) of 46% above 5 microns, 24% below 2 microns and 16% below one micron. A sheet coated with this clay under the conditions previously described, had an uncalendered gloss of 3.0, a G.E. brightness of 72.3 and a Dennison wax pick of 12.

The mixture was stirred for four hours and a portion of the product taken at the end of this time was acidified, bleached with sodium hydrosulfite, filtered and dried. The product, before bleaching, had a G.E. brightness of 88.5, and after bleaching, had a G.E. brightness of 91.2, a particle size distribution (equivalent spherical diameter) of 3% above 5 microns, 70% below two microns and 53% below one micron. A sheet coated with the material had an uncalendered gloss of 13.3, a G.E. brightness of 79.3 and a Dennison wax pick of 12. Calendered sheet properties obtained from the use of this product are shown in Table II.

A portion of the product taken after three hours' delamination from the run above described had a particle size distribution of 11.5% above 5 microns, 48% below 2 microns and 34% below one micron in equivalent spherical diameter. The material was used to coat a sheet of paper and the calendered gloss and opacity obtained from its use is illustrated in Table II. The remarkable coverage obtainable from the large delaminated plates is shown by the opacity value. The absence or virtual absence of booklets allows the high gloss value obtained. Heretofore, clays of this relative coarseness could not have even been considered as a coating material.

EXAMPLE 9

This example illustrates the use of a continuous process in which a #3 grade of domestic coating clay was used as the starting material. The clay had a particle size distribution of 12.5% above 5 microns, 66.5% below 2 microns and 53% below 1 micron. The G.E. brightness of the material was 84.9 and a sheet coated with the clay had an uncalendered brightness of 78.5, a gloss of 4.0 and gave a Dennison wax pick on No. 10 wax. The clay had been prepared by conventional procedures (washing, particle sizing, bleaching, etc.) and is a commercially available product (No. 70 Clay, Southern Clays, Inc.).

The clay was dispersed in water at 31.5% solids, with 0.4% tetrasodium pyrophosphate being used as the dispersing agent, and an amount was fed continuously into the delamination apparatus shown in FIGURE 1 so that a nylon pellet (1/10 inch in length) to dry clay ratio of about 5:3 was obtained. The apparatus permitted the removal of fines at the rate desired and allowed selection of the particular grade of product desired, graded on a particle size distribution basis.

When this apparatus was operated with continuous withdrawal of a product containing 91% of its particles below 2 microns in equivalent spherical diameter, a product was obtained, which before bleaching, had a G.E. brightness of 88.5, and which after bleaching had a G.E. brightness of 89.0.

This product was allowed to settle for one hour per inch and 3.7% of a discolored material collected at the bottom of the container.

The product was removed from the settled material by careful decantation and was then acidified to pH 4–5 with sulfuric acid, bleached by the addition of 1.14 grams of sodium hydrosulfite (sodium hyposulfite) per pound of dry clay, filtered, dried and pulverized.

The product so obtained had a particle size distribution of 0% above 5 microns, 91.2% below 2 microns, and 75% below 1 micron, a G.E. brightness of 92.1 and an excellent white color. A sheet coated with the product had an uncalendered brightness of 83.0, a gloss of 16.5, and gave a Dennison wax pick on No. 11 wax.

The product, when examined under an electron micrograph, was free from stacks but contained platelets of more than 5 microns equivalent spherical diameter. The calculated average diameter of all of the particles of the product was 0.560 micron, as compared with a calculated diameter for a conventional No. 1 coating clay of 0.434. The calculated average thickness of the particles of the product of this example was 0.0550, as compared with 0.051 for a conventional No. 1 coating clay. The particle size distribution by actual measurements of electron micrographs is illustrated in FIG. 14.

Paper sheets were coated with the starting material, with the delaminated product and with a high grade English coating clay under strictly comparable conditions and the results obtained on the calendered sheets are shown in Table IV.

TABLE IV

*Calendered sheet properties*

[Sheets calendered at a pressure of 1800 p.l.i.]

| Description | Gloss | Brightness | Opacity | Adhesive demand Dennison wax pick on wax no. |
|---|---|---|---|---|
| Starting material for Example 9—#3 grade for domestic coating clay | 40.9 | 75.0 | 93.8 | 12 |
| Product from Example 9 | 68.6 | 78.0 | 94.6 | 10 |
| English coating clay (Starflow) for comparison | 63.2 | 77.7 | 94.3 | 7 |
| Starting material for Example 10—Top grade of domestic coating clay | 57.1 | 75.9 | 96.7 | 10 |
| Product from Example 10 | 62.7 | 77.7 | 95.4 | 11 |

The remarkable increase in pigment brightness and in coating properties (high gloss, sheet brightness and in opacity) are important. The product equals or excels the English coating clay in every respect and, in addition, has rheological properties much better than those shown by the English coating clay, thus facilitating machine coating application.

The product gave a free flowing slurry at 74% clay-water solids, dispersed to minimum viscosity with 0.3% tetrasodium pyrophosphate (gave a Stormer viscosity reading of 45 seconds for 100 revolutions at 74% solids using a 150 gram weight, using largest spindle), while the English clay (one specially treated to have the best possible viscosity characteristics) would not flow easily at clay-water solids above 65% (gave a Stormer viscosity reading of 50 seconds for 100 revolutions at 65% solids and a reading over 1000 seconds at 70% solids, using a 150 gram weight and largest spindle).

The delamination procedure freed discoloring impurities so that ordinary sedimentation or centrifugal methods could be used to effect their removal from the clay product. Thus, analysis of the starting material, the product and the 3.7% of material that was obtained from the sedimentation procedure mentioned earlier gave the results shown below:

| | G. E. brightness | Percent Fe₂O₃ | Percent TiO₂ |
|---|---|---|---|
| Starting material | 84.9 | 0.375 | 1.274 |
| Product | 92.1 | 0.320 | 0.756 |
| Sediment | 75.7 | 0.391 | 5.38 |

The removal of a titanium-containing impurity is significant. Since small amounts of iron and aluminum can be detected in the filtrate water after the delamination procedure, some removal of impurities in the filtrate and some ionic replacement are indicated.

Sedimentation of the starting material (before delamination) to obtain 3.8% of coarser sediment and subsequent analysis of each fraction gave the following results, which serve as controls for the above.

| | G. E. brightness | Percent Fe₂O₃ | Percent TiO₂ |
|---|---|---|---|
| Starting material | 84.9 | 0.375 | 1.274 |
| Top Fraction | 86.4 | 0.284 | 1.688 |
| Coarse Sediment | 83.0 | 0.296 | 1.090 |

A comparison of these sedimentation procedures applied to the starting material and to the delaminated product shows that the delamination treatment of the clay resulted in separation of significant amounts of titanium-containing impurity in the sediment and a very marked increase in G.E. brightness of the delaminated product after this separation.

EXAMPLE 10

The procedure given in Example 9 was followed except that a finer grade of domestic coating clay was used as the starting material. This clay had a particle size distribution of 3% above 5 microns, 84.5% below 2 microns, and 65% below 1 micron. The G.E. brightness of the material was 86.5 and a sheet coated with the clay had an uncalendered brightness of 79.1, a gloss of 8.2 and gave a Dennison wax pick on No. 11 wax. The clay had been prepared by conventional procedures (washing, particle sizing, etc.).

When the apparatus was operated with continuous withdrawal of a product containing 96% of its particles below 2 microns in equivalent spherical diameter the product had a G.E. brightness of 88.2. This product was allowed to settle for 1 hour per inch and 2.9% of a discolored material collected at the bottom of the container. This separation could also be performed by centrifugation or by other forms of classification.

The product was removed from the settled material by careful decantation and was then acidified (to pH 4–5) with sulfuric acid, bleached by the addition of 0.68 gram of sodium hydrosulfite per pound of dry clay, filtered, dried and pulverized. The product, before bleaching, had a G.E. brightness of 88.2, and, after bleaching, had a G.E. brightness of 90.5, and an excellent white color.

The product, when examined under an electron microscope showed freedom from stacks, and showed platelets of considerably more than 2 microns in equivalent spherical diameter, whereas the coating clay used as the starting material for the process showed stacks of more than 2 microns size. FIGS. 7 and 8 are electron micrographs of samples of the starting material, and of the product, respectively. FIG. 7 shows relatively thick stacks, while FIG. 8 shows only thin platelets.

A sheet coated with the product had an uncalendered brightness of 82.3, a gloss of 19.6, and gave a Dennison wax pick on No. 11 wax. Paper sheets were coated with the starting material, with the product and with a high grade English coating clay under comparable conditions as mentioned in Example 9. The results obtained on the calendered sheets are shown in Table IV.

The Stormer viscosity of a 72% solids clay-water dispersion, of the product (tetrasodium pyrophosphate was used as the dispersing agent) was 22 seconds for 100 revolutions using a 150 gram weight and the largest spindle. The viscosity of the English coating clay is given in Example 9.

The starting material, the product after sedimentation and the sediment were analyzed and the results are shown below:

|  | G.E. brightness | Percent Fe₂O₃ | Percent TiO₂ |
|---|---|---|---|
| Starting material | 86.5 | 0.308 | 1.604 |
| Product | 90.5 | 9.315 | 0.960 |
| Sediment | 75.0 | 0.414 | 13.84 |

Sedimentation of the starting material (before delamination) to obtain 2.2% of coarser sediment and subsequent analysis of each fraction gave the following results, which serve as controls for the above.

|  | G.E. brightness | Percent Fe₂O₃ | Percent TiO₂ |
|---|---|---|---|
| Starting material | 86.5 | 0.308 | 1.604 |
| Top fraction | 86.3 | 0.253 | 1.830 |
| Coarse sediment | 82.5 | 0.249 | 1.562 |

A comparison of the results of the sedimentation as applied to the starting material with those obtained with the product after delamination shows the importance of the delamination process in separating titanium-containing impurities, so that they can be removed by sedimentation to give a delaminated product with a greatly increased G.E. brightness.

The starting materials, and the products from Examples 9 and 10 were calcined for 1 hour at 1860° F. in an electrically heated Lindberg Laboratory furnace and the G.E. brightness and abrasion values of the calcined products are given in Table V. Each sample was pulverized before and after the calcination procedure.

TABLE V

*Calcined pigment properties*

| Description | G.E. brightness | Abrasion (mg.) |
|---|---|---|
| Starting material for Example 9—calcined | 90.2 | 499.3 |
| Product from Example 9—calcined | 96.7 | 205 |
| Starting material for Example 10—calcined | 93.0 | 317.4 |
| Product from Example 10—calcined | 96.0 | 173.5 |

The coating comparisons shown in the Tables II and IV were run under the same standard conditions, using fifteen parts of casein as adhesive to 100 parts of pigment. The sheets were coated by means of an air knife applicator and were calendered at about 1800 p.s.i. The calendered sheet gloss was determined on a Bausch & Lomb glossmeter.

The viscosity measurements were made using a Stormer viscosimeter equipped with the largest spindle and using a 150 gram weight. The clay is dispersed to minimum viscosity (with tetrasodium pyrophosphate) at the indicated solids, and the time in seconds required for 100 revolutions is determined and is used as the measure of viscosity.

The new delaminated clay products with a G.E. brightness of 90 or higher and with a white color comparable to that of white British clay are of special value for use in the paper industry as coating clays, with resulting improvement in gloss, as well as brightness and color, of the coated sheet. They are also of special value for use as filler clays for filling paper or paperboard, where whiteness, brightness and opacity are important.

They are also useful for other purposes such as paint pigments, and purposes where high brightness and a white color are desired.

The new and distinguishing properties of the new products are further indicated and emphasized by subjecting the products to calcining, where a further and surprising result is obtained in the unusually high brightness of the calcined product, around 95 to 99, and by the unusually low abrasion index of the calcined products.

The calcining of the new clay products made by delaminating coarse filler clay can be carried out in the manner hereinafter described, while the properties of the calcined product can readily be determined in the laboratory by subjecting a sample of the new coating clay product to calcining in a crucible in an electrically heated Lindberg Laboratory furnace heated to 1860° F. (1016° C.) for a period of one hour. The sample to be tested is pulverized by means of a hammer mill before it is packed in the crucible, and the calcined product, after cooling, is again pulverized by means of a hammer mill.

When subjected to this calcining test, it was found that the product of Example 2, which, before calcining, had a G.E. brightness of 92.1 and an abrasion of about 5 mg., gave a product, after calcining, with a G.E. brightness of 99.0 and an abrasion of 80 mg. by the test hereinafter referred to.

For purposes of comparison, a sample of English clay was similarly calcined, this clay containing 2% over 5 microns, 81% below 2 microns, and 68% below 1 micron. The G.E. brightness of this clay before calcining was 91.0, and after calcining was increased only to 92.8. This product, before calcining, had an abrasion of 30 mg., and, after calcining, had an abrasion of 463 mg.

For purposes of comparison, a high grade domestic coating clay containing 0% over 5 microns, 92% below 2 microns, and 80% below 1 micron was similarly calcined. The uncalcined product had a G.E. brightness of 87.0 and an abrasion of 0.5 mg. The same product, after calcination, had a brightness of 93.5 and an abrasion of 450 mg.

As compared with such products, the new calcined clay product made by delamination of coarse filler clay has a remarkably high G.E. value of 95 to 99 and a remarkably low abrasion value of less than 100.

Tests on the new product have shown an increase in brightness on calcination to around 5 to 7 points, with resulting brightness between 95 and 99, which is a much greater increase and a higher brightness value than any coating clay products with which we are familiar.

The abrasion figure for the new calcined products is unusually low.

The method used in determining the abrasion figures above indicated was a modification of the method approved by the Institute of Paper Chemistry, but makes use of the same "Valley" apparatus, which is used in carrying out the approved tests. The abrasion index determined by the modified method gives a higher figure than that determined by the method approved by the Institute of Paper Chemistry. The index obtained by that method is about 50% to 60% of the abrasive index, as determined by the modified method used in determining the above figure. Accordingly, an abrasive index of 100 or less for the new products, determined by the modified method, represents an abrasive index of around 56 to 60 or less by the approved method. The modified method used in determining the above figures was carried out as follows:

This "Valley" apparatus utilizes a tank, and also uses mesh wire cloth which is made of Phosphor bronze, and also uses a "Micarta" block.

The machine is thoroughly cleaned and then flushed with clear water.

The Phosphor bronze woven wire cloth is cut to a test piece of rectangular form, with a length of 8¹³⁄₁₆ inches and a width of 3⁷⁄₁₆ inches. This test piece is washed with soap and water, dried, cooled to 20° C.–30° C. and accurately weighed. Its openings are No. 60 sieve, with openings whose size is 0.250 millimeter or 0.0098 inch. The warp wires of this test piece have a thickness of 0.0092 inch. The filler wires of this test piece have a thickness of 0.010 inch. The total thickness of this test piece of wire mesh is a thickness of about 0.024 inch.

108.5 grams of the clay or other test material whose abrasiveness is to be tested in fine powder form, are mixed with 604.5 grams of water. The mixture of water and fine particles is passed into the tank through a No. 80 sieve, whose sieve opening is 0.177 millimeter or 0.0070 inch, while the valve at the bottom of the tank is closed. The test piece of wire cloth is then clamped into position.

The weighted "Micarta" block is placed in its frame. The block is connected to a driving rod. The frame remains stationary. The weighted "Micarta" block rests on the top of the test piece of wire cloth.

The "Micarta" is a well-known molded material, which is made from fabric or paper which is impregnated with phenol formaldehyde thermosetting resin, and is then compressed under heat in order to set the resin.

According to the standards of the Institute of Paper Chemistry, the weight of this weighted "Micarta" block is 17.2 pounds to 17.5 pounds. This includes the "Micarta" block, and a lead weight. In the tests used herein, the total weight of the "Micarta" weighted block was 18 pounds. This "Micarta" is known as "Canvas Base—Westinghouse No. G–270."

The "Valley" machine is then operated to pump the clay-water slurry or other test aqueous slurry continuously, in a single direction, around the "Micarta" block and the wire cloth, while the "Micarta" block is continuously reciprocated in six thousand complete reciprocations or double strokes. The "Micarta" block thus applied the particles of the test slurry frictionally to the Phosphor bronze wire cloth.

The wire cloth is then removed, washed, dried and weighed. The loss of weight of the wire cloth in milligrams is the abrasion index or value of the respective material. Thus, if the loss of weight of the piece of wire cloth is sixty milligrams, the abrasion value or erosion factor of the tested slurry is designated as "sixty" or as "sixty milligrams."

In this abrasion test, the kaolin or other material is not usually deflocculated, but it may be deflocculated. The tested material forms a uniform powder mixture with the water during the test.

The calcining of the new product to produce a calcined product is carried out by heating the product to a temperature sufficient to drive off the mechanical or hygroscopic water from the clay, as well as the combined water, which is driven off at around 400 to 600° C. and also with further heating to bring about an exothermic reaction which usually takes place at about 721° to 980° C.

In general, the clay fraction is calcined by heating to a temperature range of 980° C. to 1038° C. This calcining can be carried out in calcining apparatus which is fed continuously and from which the calcined material is continuously discharged with stirring or agitation of the clay during the calcination.

Calcining furnaces such as are used for the calcining of other clay products can thus be used, with proper control of the temperature.

In referring to the particle size distribution of the clay, except where otherwise indicated, this is determined by the common sedimentation methods giving results expressed in terms of "equivalent spherical diameter." The figures given are expressed in such terms. This sedimentation method for determining particle size is described in the TAPPI publication T649sm–54, entitled "Particle Size Distribution of Coating Clay," issued November 1954. Where the particle sizes are measured from electron micrographs, this is also indicated.

In referring to the gloss of an uncalendered or calendered coated sheet, the gloss was determined on a Bausch & Lomb glossmeter.

A still further improvement in the calcined clay product can be accomplished by subjecting the calcined clay to a delamination treatment by the process and in the apparatus previously described for the treatment of coarse clay fractions. Such delamination treatment gives a marked improvement in almost all important properties of the calcined clay, including abrasion, with a material reduction in the abrasion index of the calcined product, e.g., a 20% reduction, together with a marked improvement in flow properties and in adhesive requirements.

We claim:
1. The method of producing a domestic sedimentary clay product of a white color and of a G.E. brightness of at least 90, which comprises subjecting Georgia sedimentary kaolin clay fractions containing a substantial amount of aggregates of above 2 microns in size to delamination by rapid agitation of an aqueous slurry of the clay with fine, non-abrasive grinding media, with resulting fine milling mechanical action including (1) a mild, viscous, shear milling due to agitation of the admixed fine milling media, water and clay, (2) a mild percussive milling due to a multiplicity of low inertia impacts from the collisions of the fine milling media with itself and with the clay, and (3) a mild frictional milling by the combination rubbing action of the fine media, continuing the delamination to effect substantially complete delamination of aggregates and to produce a delaminated clay product characterized by substantial freedom from aggregates and having a distinct white color and a G.E. brightness, after bleaching, of at least 90, and bleaching the resulting clay product.

2. The method according to claim 1 in which the process is carried out in a continuous manner with continuous feed of the clay slurry and continuous withdrawal of the slurry and the separation and removal of a delaminated clay fraction and return of the coarser clay fraction for further delaminating treatment.

3. The method according to claim 1 in which the clay produc produced is subjected to calcination to produce a calcined product.

4. The method of producing a domestic sedimentary clay product of a white color and of a G.E. brightness of at least 90, which comprises subjecting Georgia sedimentary koalin clay fractions containing a substantial amount of aggregates of above 2 microns in size with titanium-containing impurities which do not separate by sedimentation to delamination by rapid agitation of an aqueous slurry of the clay with fine, non-abrasive grinding media with resulting fine milling mechanical action including (1) a mild, viscous, shear milling due to agitation of the admixed fine milling media, water and clay, (2) a mild percussive milling due to a multiplicity of low inertia impacts from the collisions of the fine milling media with itself and with the clay, and (3) a mild frictional milling by the combination rubbing action of the fine media, continuing the delamination to effect substantially complete delamination of aggregates and to effect separation of titanium-containing impurities and to produce a delaminated clay product characterized by substantial freedom from aggregates and having a distinct white color and a G.E. brightness, after bleaching, of at least 90, separating titanium-containing impurities from such product by a gravity-differential treatment, and bleaching the resulting clay product.

5. The method according to claim 4 in which the process is carried out in a continuous manner with continuous feed of the clay slurry and continuous withdrawal of the slurry and the separation and removal of a delaminated clay fraction and return of the coarser clay fraction for further delaminating treatment.

6. The method according to claim 4 in which the clay product produced is subjected to calcination to produce a calcined product.

7. The method of producing a domestic sedimentary clay product of a white color and of a G.E. brightness of at least 90, which comprises subjecting coarse Georgia sedimentary kaolin clay fraction made up mainly of aggregates of above 5 microns in size to delamination by rapid agitation of an aqueous slurry of the clay with fine, non-abrasive grinding media, with resulting fine milling mechanical action including (1) a mild, viscous, shear milling due to agitation of the admixed fine milling media, water and clay, (2) a mild percussive milling due to a multiplicity of low inertia impacts from the collisions of the fine milling media with itself and with the clay, and (3) a mild frictional milling by the combination rubbing action of the fine media, continuing the delamination to effect substantially complete delamination of aggregates and to produce a delaminated clay product characterized by substantial freedom from aggregates and having a distinct white color and a G.E. brightness, after bleaching, of at least 90, and bleaching the resulting clay product.

8. The method according to claim 7 in which the process is carried out in a continuous manner with continuous feed of the clay slurry and continuous withdrawal of the slurry and the separation and removal of a delaminated clay fraction and return of the coarser clay fraction for further delaminating treatment.

9. The method according to claim 7 in which the clay product produced is subjected to calcination to produce a calcined product having a G.E. brightness of about 95 to 97 and an abrasion index below 100.

10. The method of producing a domestic sedimentary clay product of a white color and of a G.E. brightness of at least 90, which comprises subjecting coarse Georgia sedimentary kaolin clay fractions made up mainly of aggregates of above 5 microns in size to delamination by rapid agitation of an aqueous slurry of the clay with fine, non-abrasive grinding media, with resulting fine milling mechanical action including (1) a mild, viscous, shear milling due to agitation of the admixed fine milling media, water and clay, (2) a mild percussive milling due to a multiplicity of low inertia impacts from the collisions of the fine milling media with itself and with the clay, and (3) a mild frictional milling by the combination rubbing action of the fine media, continuing the delamination to effect substantially complete delamination of aggregates and to effect separtion of titanium-containing compounds and to produce a delaminated clay product characterized by substantial freedom from aggregates and having a distinct white color and a G.E. brightness, after bleaching, of at least 90, separating titanium-containing impurities from such product by a gravity-differential treatment, and bleaching the resulting clay product.

11. The method according to claim 10 in which the process is carried out in a continuous manner with continuous feed of the clay slurry and continuous withdrawal of the slurry and the separation and removal of a delaminated clay fraction and return of the coarser clay fraction for further delaminating treatment.

12. The method according to claim 10 in which the clay product produced is subjected to calcination to produce a calcined product.

13. The method of treating sedimentary Georgia kaolin coating clay fractions containing more than about two-thirds of the clay as particles below 2 microns in size and containing aggregates of more than 2 microns in size with titanium-containing impurities which do not separate by sedimentation, which comprises subjecting them to delamination by rapid agitation of a slurry of the clay with fine, non-abrasive grinding media, with resulting fine milling mechanical action including (1) a mild, viscous, shear milling due to agitation of the admixed fine milling media, water and clay, (2) a mild percussive milling due to a multiplicity of low inertia impacts from the collisions of the fine milling media with itself and with the clay, and (3) a mild frictional milling by the combination rubbing action of the fine media, and continuing the delamination to effect delamination of said aggregates to platelets and to effect separation of titanium-containing impurities and to produce a fine delaminated clay product.

14. The method according to claim 13 followed by the separation of titanium-containing impurities from such product by a gravity-differential separation treatment.

15. The method according to claim 13 in which the process is carried out in a continuous manner with continuous feed of clay slurry and continuous withdrawal of the slurry and separation and removal of a delaminated clay fraction and return of the coarser clay fraction for further delamination treatment.

16. The method according to claim 13 in which the clay product produced is subjected to calcination to produce a calcined product.

17. A new delaminated sedimentary clay product produced by delamination of a domestic sedimentary kaolin clay fraction containing substantial amounts of aggregates of more than two microns in size, said clay product having a bleached G.E. brightness of at least 90, having a distinct blue-white color comparable with that of imported English clays, said product being substantially free of undelaminated aggregates and booklets and being composed substantially of individual platelets, and containing a sufficient amount of platelets of more than two microns in size so as to predominate on a weight basis, the platelets in excess of two microns in size of said product having a ratio of diameter to thickness as determined by the electron micrograph, which is in excess of 6 and in which the ratio of diameter to thickness increases as the diameter of the platelets increase, and giving a coated paper with an improved uncalendered gloss at least several points higher on the Bausch & Lomb glossmeter than the uncalendered gloss of conventional domestic coating clays of comparable size distribution, said clay product having an adhesive demand no greater than that of conventional domestic coating clays of comparable particle size distribution, and said clay product on calcination giving a calcined product having a materially increased G.E. brightness and a materially lower abrasion index than conventional calcine domestic clays.

18. A new delaminated sedimentary clay product produced by delamination of a coarse domestic sedimentary kaolin clay fraction made up largely of aggregates of more than 5 microns in size, said clay product having a bleached G.E. brightness of at least 90, having a distinct blue-white color comparable with that of imported English clays, said product being substantially free from undelaminated aggregates and booklets and being composed substantially of individual platelets, and containing a sufficient amount of platelets of more than two microns in size so as to predominate on a weight basis, the platelets in excess of two microns in size of said product having a ratio of diameter to thickness as determined by the electron micrograph, which is in excess of 6 and in which the ratio of diameter to thickness increases as the diameter of the platelets increase, and giving a coated paper with an improved uncalendered gloss at least several points higher on the Bausch & Lomb glossmeter than the uncalendered gloss of conventional domestic coating clays of comparable size distribution, said clay product having an adhesive demand no greater than that of conventional domestic coating clays of comparable particle size distribution, and said clay product on calcination giving a calcined product having a materially increased G.E. brightness and a materially lower abrasion index than conventional calcine domestic clays.

19. A new delaminated sedimentary coating clay product produced by delamination of sedimentary, kaolin coating clay fractions containing more than about two-thirds of the clay as particles below 2 microns in size, and containing aggregates of more than 2 microns in size and titanium-containing impurities not separable by sedimentation, said delaminated product being freed from titanium-containing impurities, and from undelaminated aggregates, having a blue-white color comparable with that of imported English coating clays, having a bleached G.E. brightness of at least 90, producing on calcination a calcined product with materially increased brightness and a materially lower abrasion index, said product having a sufficient amount of platelets of more than 2 microns in size so as to predominate on a weight basis, the platelets in excess of 2 microns in size of said product having a ratio of diameter to thickness as determined by electron micrograph which is in excess of 6 and in which the ratio of diameter to thickness increases as the diameter of the platelets increases, said product giving a coated paper with an improved uncalendered gloss at least several points higher on the Bausch & Lomb glossmeter than the uncalendered gloss of conventional domestic coating clays of comparable size and distribution and said product having an adhesive demand no greater than that of conventional domestic coating clays of comparable size and distribution.

20. A new delaminated clay product produced by delamination of a domestic sedimentary kaolin clay fraction containing substantial amounts of aggregates of more than two microns in size, said clay product having a distinct blue-white color comparable with that of imported English clays, said product being substantially free of undelaminated aggregates and booklets and being composed substantially of individual platelets, and containing a sufficient amount of platelets of more than two microns in size so as to predominate on a weight basis, the platelets in excess of two microns in size of said product having a ratio of diameter to thickness as determined by the electron micrograph, which is in excess of 6 and in which the ratio of diameter to thickness increases as the diameter of the platelets increase, and giving a coated paper with an improved uncalendered gloss at least several points higher on the Bausch & Lomb glossmeter than the uncalendered gloss of conventional domestic coating clays of comparable size distribution, said clay product having an adhesive demand no greater than that of conventional domestic coating clays of comparable particle size distribution, and said clay product on calcination giving a calcined product having a materially increased G.E. brightness and a materially lower abrasion index than conventional calcine domestic clays.

21. A new delaminated clay product produced by delamination of a coarse domestic sedimentary kaolin clay fraction made up largely of aggregates of more than 5 microns in size, said clay product having a distinct blue-white color comparable with that of imported English clays, said product being substantially free from undelaminated aggregates and booklets and being composed substantially of individual platelets, and containing a sufficient mount of platelets of more than two microns in size so as to predominate on a weight basis, the platelets in excess of two microns in size of said product having a ratio of diameter to thickness as determined by the electron micrograph, which is in excess of 6 and in which the ratio of diameter to thickness increases as the diameter of the platelets increase, and giving a coated paper with an improved uncalendered gloss at least several points higher on the Bausch & Lomb glossmeter than the uncalendered gloss of conventional domestic coating clays of comparable size distribution, said clay product having an adhesive demand no greater than that of conventional domestic coating clays of comparable particle size distribution, and said clay product on calcination giving a calcined product having a materially increased G.E. brightness and a materially lower abrasion index than conventional calcine domestic clays.

22. A new delaminated coating clay product produced by delamination of domestic sedimentary kaolin coating clay fractions containing more than about two-thirds of the clay as particles below 2 microns in size, and containing aggregates of more than 2 microns in size and titanium-containing impurities not separable by sedimentation, said delaminated product being freed from titanium-containing impurities, and from undelaminated aggregates and booklets and being composed substantially of individual platelets, having a blue-white color comparable with that of imported English coating clays, producing on calcination a calcined product with materially increased brightness and a materially lower abrasion index, said product having a sufficient amount of platelets of more than 2 microns in size so as to predominate on a weight basis, the platelets in excess of 2 microns in size of said product having a ratio of diameter to thickness as determined by electron micrograph which is in excess of 6 and in which the ratio of diameter to thickness increases as the diameter of the platelets increases, said product giving a coated paper with an improved uncalendered gloss at least several points higher on the Bausch & Lomb glossmeter than the uncalendered gloss of conventional domestic coating clays of comparable size and distribution and said product having an adhesive demand no greater than that of conventional domestic coating clays of comparable size and distribution.

23. The method of producing a domestic clay product which comprises subjecting domestic sedimentary kaolin clay fractions containing substantial amounts of aggregates of above two microns in size to delamination by rapid agitation of an aqueous slurry of the clay with fine non-abrasive milling media, with resulting fine milling mechanical action including (1) a mild, viscous, shear milling due to agitation of the admixed fine milling media, water and clay, (2) a mild percussive milling due to a multiplicity of low inertia impacts from the collisions of the fine milling media with itself and with the clay, and (3) a mild frictional milling by the combination rubbing action of the fine media, continuing the delamination to effect substantially complete delamination of aggregates and to produce a delaminated clay product characterized by substantial freedom from aggregates and being substantially composed of individual platelets.

24. The method of treating sedimentary Georgia kaolin clay fractions containing substantial amounts of aggregates of more than 2 microns in size with titanium-containing impurities which do not separate by sedimentation, which comprises subjecting them to delamination by rapid agitation of a slurry of the clay with fine, non-abrasive grinding media, with resulting fine milling mechanical action including (1) a mild, viscous, shear milling due to agitation of the admixed fine milling media, water and clay, (2) a mild percussive milling due to a multiplicity of low inertia impacts from the collisions of the fine milling media with itself and with the clay, and (3) a mild frictional milling by the combination rubbing action of the fine media, and continuing the delamination to effect delamination of said aggregates to platelets and to effect separation of titanium-containing impurities and to produce a fine delaminated clay product.

References Cited by the Examiner

UNITED STATES PATENTS

| | | | |
|---|---|---|---|
| 1,999,773 | 4/35 | McMichael | 23—110.2 |
| 2,305,404 | 12/42 | Brown | 106—72 X |
| 2,569,680 | 10/51 | Leek. | |
| 2,581,414 | 1/52 | Hochberg | 241—22 |
| 2,855,156 | 10/58 | Hochberg et al. | 241—46 X |
| 2,904,267 | 9/59 | Lyons. | |
| 2,920,832 | 1/60 | Duke | 23—110.2 X |
| 3,034,859 | 5/62 | Gunn et al. | 23—110 |
| 3,058,671 | 10/62 | Billue | 23—110.2 X |
| 3,086,877 | 4/63 | Sheehan et al. | 106—300 |

FOREIGN PATENTS 736,094  9/55  Great Britain.

MAURICE A. BRINDISI, *Primary Examiner.*